United States Patent
Hayaishi

(10) Patent No.: US 8,031,915 B2
(45) Date of Patent: Oct. 4, 2011

(54) IMAGE PROCESSING DEVICE AND IMAGE PROCESSING METHOD

(75) Inventor: Ikuo Hayaishi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 860 days.

(21) Appl. No.: 12/057,271

(22) Filed: Mar. 27, 2008

(65) Prior Publication Data

US 2008/0240610 A1    Oct. 2, 2008

(30) Foreign Application Priority Data

Mar. 29, 2007   (JP) ................. 2007-087602

(51) Int. Cl.
*G06K 9/00* (2006.01)
(52) U.S. Cl. ........ 382/118; 382/106; 382/162; 382/254; 382/123; 345/156; 345/7; 345/8
(58) Field of Classification Search .......... 382/118, 382/106, 162, 254, 123; 345/156, 7, 8
See application file for complete search history.

(56) References Cited

U.S. PATENT DOCUMENTS

| | | | |
|---|---|---|---|
| 7,324,669 B2 | 1/2008 | Nakanishi et al. | |
| 7,883,415 B2 * | 2/2011 | Larsen et al. | 463/36 |
| 2005/0180611 A1 * | 8/2005 | Oohashi et al. | 382/118 |

FOREIGN PATENT DOCUMENTS

| | | |
|---|---|---|
| JP | 2004140693 A | 5/2004 |
| JP | 2004264893 A | 9/2004 |
| JP | 2004-318204 | 11/2004 |
| JP | 2004318204 A | 11/2004 |
| JP | 2005025703 A | 1/2005 |
| JP | 2005141523 A | 6/2005 |

* cited by examiner

*Primary Examiner* — Mike Rahmjoo
(74) *Attorney, Agent, or Firm* — DLA Piper LLP (US)

(57) ABSTRACT

An image processing device includes a deformation processing unit that deforms at least a portion of an area on a target image, which is generated by photographing, based on a distance between a photographic device and a subject of the target image. A deformation amount adjustment unit uses a distance parameter that correlates with the distance between the photographic device and the subject of the target image when photographing to thereby adjust a degree of deformation to increase as a distance indicated by the distance parameter becomes shorter.

9 Claims, 30 Drawing Sheets

$$W1 = 2\sqrt{r^2 - \frac{r^4}{d^2}}$$

$$W2 = \frac{-4r^2L + 4\sqrt{4d^4r^2 + d^2r^2L^2 - 4r^4d^2}}{L^2 + 4d^2}$$

FIRST EXAMPLE EMBODIMENT

FIRST EXAMPLE EMBODIMENT

THIRD EXAMPLE EMBODIMENT

THIRD EXAMPLE EMBODIMENT

FOURTH EXAMPLE EMBODIMENT

FIFTH EXAMPLE EMBODIMENT

SIXTH EXAMPLE EMBODIMENT

SEVENTH EXAMPLE EMBODIMENT

|  | H | V |
|---|---|---|
| D11 | DQp | 2*DQp |
| D21 | DQp | 2*DQp |
| D31 | -DQ | 2*DQp |
| D41 | -DQp | 2*DQp |
| D12 | DQp | 0 |
| D22 | 0 | 0 |
| D32 | 0 | 0 |
| D42 | -DQp | 0 |

IMAGE PROCESSING DEVICE AND IMAGE PROCESSING METHOD

BACKGROUND

1. Technical Field

The present invention relates to an image processing technology for deforming at least portion of an area on a target image.

2. Related Art

An image processing technology in which a digital image is deformed is described, for example, in JP-A-2004-318204. JP-A-2004-318204 describes an image processing in which a shape of a face is deformed in such a manner that a portion of an area on the image of the face (an area that shows the image of a cheek) is set as a correction area, the correction area is divided into a plurality of small areas in accordance with a predetermined pattern and then the image is enlarged or reduced by a scaling factor set for each small area.

Conditions of generating an image (for example, photographing) and conditions of outputting an image (for example, displaying or printing) may variously change. The generating conditions include, for example, a distance between a subject and a photographic device in photographing, brightness of a subject in photographing, and the like. The outputting conditions include, for example, paper size in printing, the size of a display monitor, and the like. The impression of a subject, which is obtained by observing an output image, variously changes in accordance with the above described conditions. As a result, even when images are uniformly deformed, there is a possibility that a desirable image might not be obtained. This problem applies not only to a case in which a face is deformed, but also commonly applies to image processing for deforming at least part of an image.

SUMMARY

The invention provides a technology that appropriately deforms an image in conformity to a condition of generation.

One aspect of the invention is an image processing device that includes a deformation processing unit. The deformation processing unit deforms at least a portion of an area on a target image, which is generated by photographing, based on a distance between a photographic device and a subject of the target image. The image processing device may further include a deformation amount adjustment unit that uses a distance parameter that correlates with the distance between the photographic device and the subject of the target image when photographing to adjust a degree of deformation to increase as a distance indicated by the distance parameter becomes shorter.

According to this image processing device, because the degree of deformation increases as the distance becomes shorter, it is possible to appropriately deform an image in conformity to a condition of generation (distance).

Moreover, the deformation processing unit may execute the deformation so that at least a size in one direction of at least portion of the subject on the target image is reduced.

According to this configuration, it is possible to appropriately deform the subject in conformity to the distance.

The image processing device may further include a detection unit that detects a subject of a predetermined type on the target image and a size calculation unit that calculates a size of the detected subject on the target image by analyzing the target image, wherein the deformation amount adjustment unit may use the size as the distance parameter that indicates that a distance is shorter as the size increases.

According to this configuration, because the size of a subject of a predetermined type is used as the distance parameter, it is possible to appropriately deform an image.

Furthermore, when a plurality of subjects are detected by the detection unit, the size calculation unit may calculate the size for each of the subjects, wherein the deformation amount adjustment unit may adjust the degree of deformation on the basis of a maximum size among the sizes of the subjects.

According to this configuration, because the degree of deformation is adjusted on the basis of the maximum size, it is possible to suppress a shortage of the degree of deformation.

Furthermore, the image processing device may further include a deformation area setting unit that sets a portion of an area, which includes a subject detected by the detection unit, on the target image as a deformation area, wherein the deformation processing unit may execute deformation of an image in the deformation area.

According to this configuration, it is possible to deform a subject without excessively deforming the entire image.

Moreover, the deformation area setting unit, when a plurality of subjects are detected by the detection unit, may select a maximum subject, of which the size is maximum, from among the plurality of subjects, and set a portion of an area that includes the maximum subject as the deformation area.

According to this configuration, it is possible to deform an attractive maximum subject without excessively deforming the entire image.

In addition, the deformation area setting unit, when a plurality of subjects are detected by the detection unit, may select a subject of which the size is larger than a given selection threshold value and set the deformation area for each of the selected subjects.

According to this configuration, it is possible to deform a subject that is relatively large and attractive without excessively deforming the entire image.

In addition, the image processing device may further include a deformation area setting unit that sets a portion of an area, which includes a subject detected by the detection unit, on the target image as a deformation area, wherein the deformation processing unit may execute deformation of an image in the deformation area.

According to this configuration, it is possible to deform a subject without excessively deforming the entire image.

Moreover, when a plurality of subjects are detected by the detection unit, (A) the size calculation unit may calculate the size for each of the subjects, (B) the deformation area setting unit may set the deformation area for each of the subjects, (C) the deformation amount adjustment unit may adjust the degree of deformation for each of the deformation areas, and (D) the deformation processing unit may execute deformation of an image in each of the deformation areas in accordance with the degree of deformation that is adjusted for each of the deformation areas.

According to this configuration, it is possible to appropriately deform each of a plurality of subjects.

In addition, the image processing device may further include a detection unit that detects a subject of a predetermined type on the target image and a deformation area setting unit that sets portion of an area, which includes a subject detected by the detection unit, on the target image as a deformation area, wherein the deformation processing unit may execute deformation of an image in the deformation area.

According to this configuration, it is possible to deform a subject without excessively deforming the entire image.

Furthermore, in the above described image processing devices, the subject may be a face of a person.

According to this configuration, it is possible to appropriately deform the target image that includes the face of a person in conformity to the distance.

The invention may be implemented in various forms. For example, it may be implemented as an image processing method and device, an image deformation method and device, an image correction method and device, a computer program for implementing the functions of these methods or devices, a recording medium that contains the computer program, data signals that are realized in carrier waves that contain the computer program, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
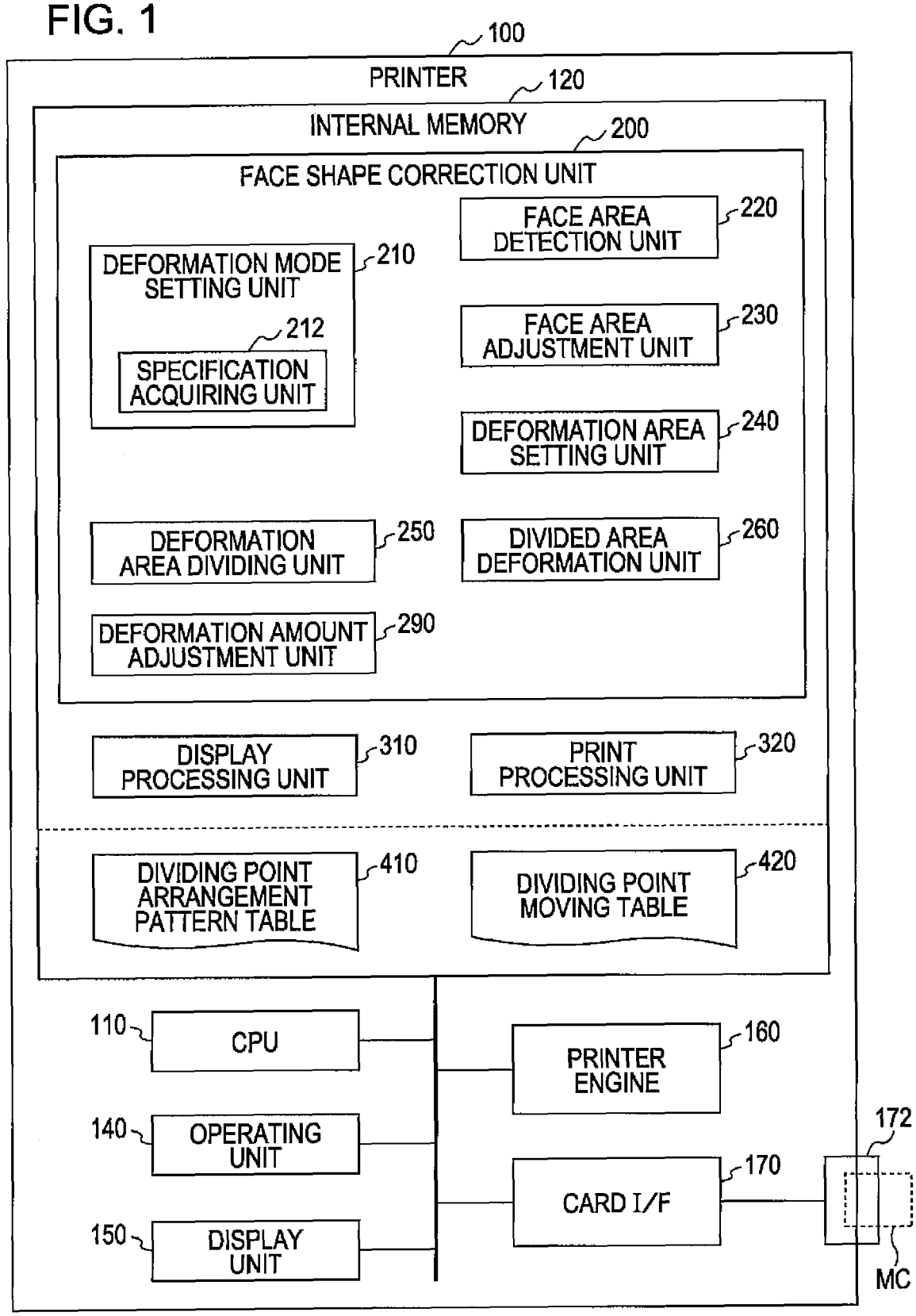
FIG. 1 is a block diagram of a printer, to which an image processing device is applied, according to a first example embodiment of the invention.

Embodiments of the invention are now described in the following order on the basis of example embodiments.
A. First Example Embodiment
B. Second Example Embodiment
C. Third Example Embodiment
D. Fourth Example Embodiment
E. Fifth Example Embodiment F. Sixth Example Embodiment
G. Seventh Example Embodiment
H. Setting of Deformation Area
I. Face Deformation Process
J. Other Deformation Process
K. Alternative Example Embodiment A. First Example Embodiment FIG. 1 is a block diagram of a printer 100, to which an image processing device is applied, according to an example embodiment of the invention. The printer 100 is a color ink jet printer that is able to print out an image on the basis of image data acquired from a memory card MC, or the like, which is so-called direct print. The printer 100 includes a CPU 110, an internal memory 120, an operating unit 140, a display unit 150, a printer engine 160, and a card interface (card I/F) 170. The CPU 110 controls the units of the printer 100. The internal memory 120 is, for example, formed of ROM and/or RAM. The operating unit 140 is formed of buttons and/or a touch panel. The display unit 150 is formed of a liquid crystal display. The printer 100 may further include an interface that performs data communication with other devices (for example, a digital still camera or a personal computer). The components of the printer 100 are connected through a bus with one another.

The printer engine 160 performs printing on the basis of print data. The card interface 170 transmits or receives data to or from the memory card MC that is inserted in a card slot 172. In the first example embodiment, the memory card MC contains image data as RGB data, and the printer 100 acquires the image data stored in the memory card MC through the card interface 170.

The internal memory 120 contains a face shape correction unit 200, a display processing unit 310 and a print processing unit 320. The face shape correction unit 200 is a computer program that executes a face shape correction process, which will be described later, under a predetermined operating system. The display processing unit 310 is a display driver that controls the display unit 150 to display a processing menu or a message on the display unit 150. The print processing unit 320 is a computer program that generates print data using image data, controls the printer engine 160 and then executes printing of an image on the basis of the print data. The CPU 110 reads out these programs from the internal memory 120 and then executes the programs to thereby realize the functions of these units.

The face shape correction unit 200 includes, as a program module, a deformation mode setting unit 210, a face area detection unit 220, a face area adjustment unit 230, a deformation area setting unit 240, a deformation area dividing unit 250, a divided area deformation unit 260 and a deformation amount adjustment unit 290. The deformation mode setting unit 210 includes a specification acquiring unit 212. As will be described later, the deformation area dividing unit 250 and the divided area deformation unit 260 perform deformation of an image. Therefore, the deformation area dividing unit 250 and the divided area deformation unit 260 may be collectively termed as a "deformation processing unit". The functions of these units will be described later.

The internal memory 120 also contains a dividing point arrangement pattern table 410 and a dividing point moving table 420. The contents of the dividing point arrangement pattern table 410 and dividing point moving table 420 will also be specifically described in the description of the face deformation process, which will be described later.

Figure 2:
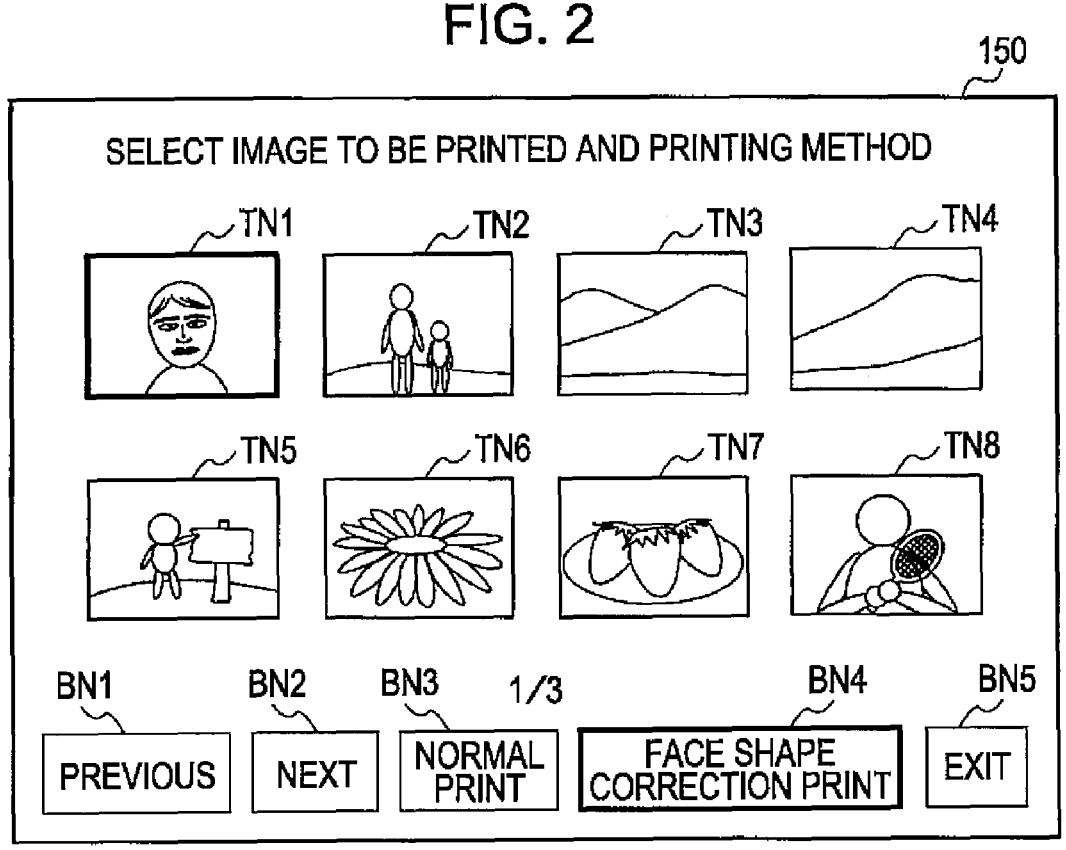
FIG. 2 is a view that illustrates one example of a user interface that includes a list display of images.

The printer 100 prints out an image on the basis of image data stored in the memory card MC. As the memory card MC is inserted into the card slot 172, a user interface that includes a list display of images stored in the memory card MC is displayed on the display unit 150 by the display processing unit 310. FIG. 2 is a view that illustrates one example of a user interface that includes the list display of images. In the first example embodiment, the list display of images is performed using thumbnail images included in the image data (image file) that are stored in the memory card MC. On the user interface shown in FIG. 2, eight thumbnail images TN1 to TN8 and five buttons BN1 to BN5 are displayed.

When a user selects an image (or multiple images) and in addition selects a normal print button BN3 using the user interface shown in FIG. 2, the printer 100 executes a normal printing process in which the selected image is printed out as usual. On the other hand, when a user selects an image (or multiple images) and in addition selects a face shape correction print button BN4 using the user interface, the printer 100 executes, on the selected image, a face shape correction printing process in which the printer 100 corrects the shape of a face in the image and then prints out the corrected image. In the example shown in FIG. 2, the thumbnail image TN1 and the face shape correction print button BN4 are being selected. Therefore, the printer 100 corrects the shape of a face in an image corresponding to the thumbnail image TN1 and then prints out the corrected image.

Figure 3:
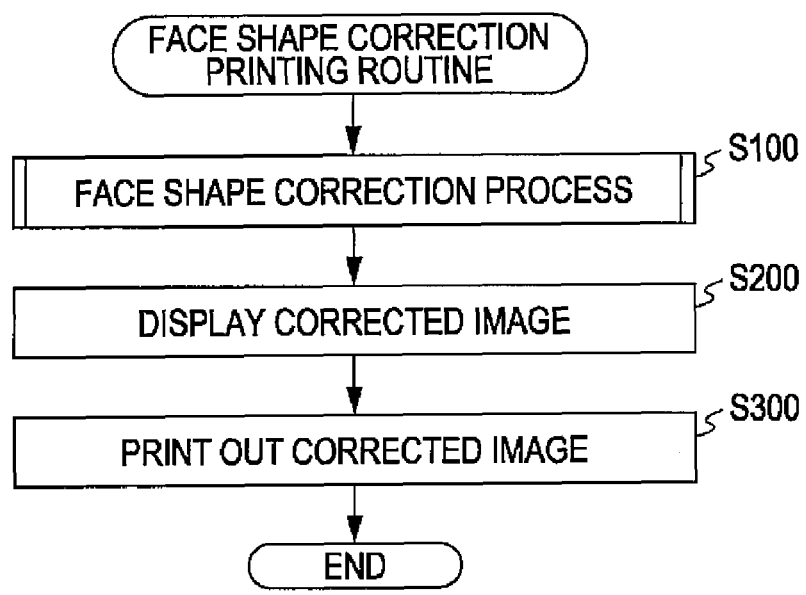
FIG. 3 is a flowchart of a face shape correction printing routine that is executed when the printer performs face shape correction printing.

FIG. 3 is a flowchart of a face shape correction printing routine that is executed when the printer 100 performs face shape correction printing. In step S100, the face shape correction unit 200 (FIG. 1) executes a face shape correction process in which at least part of the shape of a face (for example, the shape of contour of a face and the shape of eyes) in the image is corrected. Parts of the face, such as eyes or a nose, are generally called organs as well.

Figure 4:
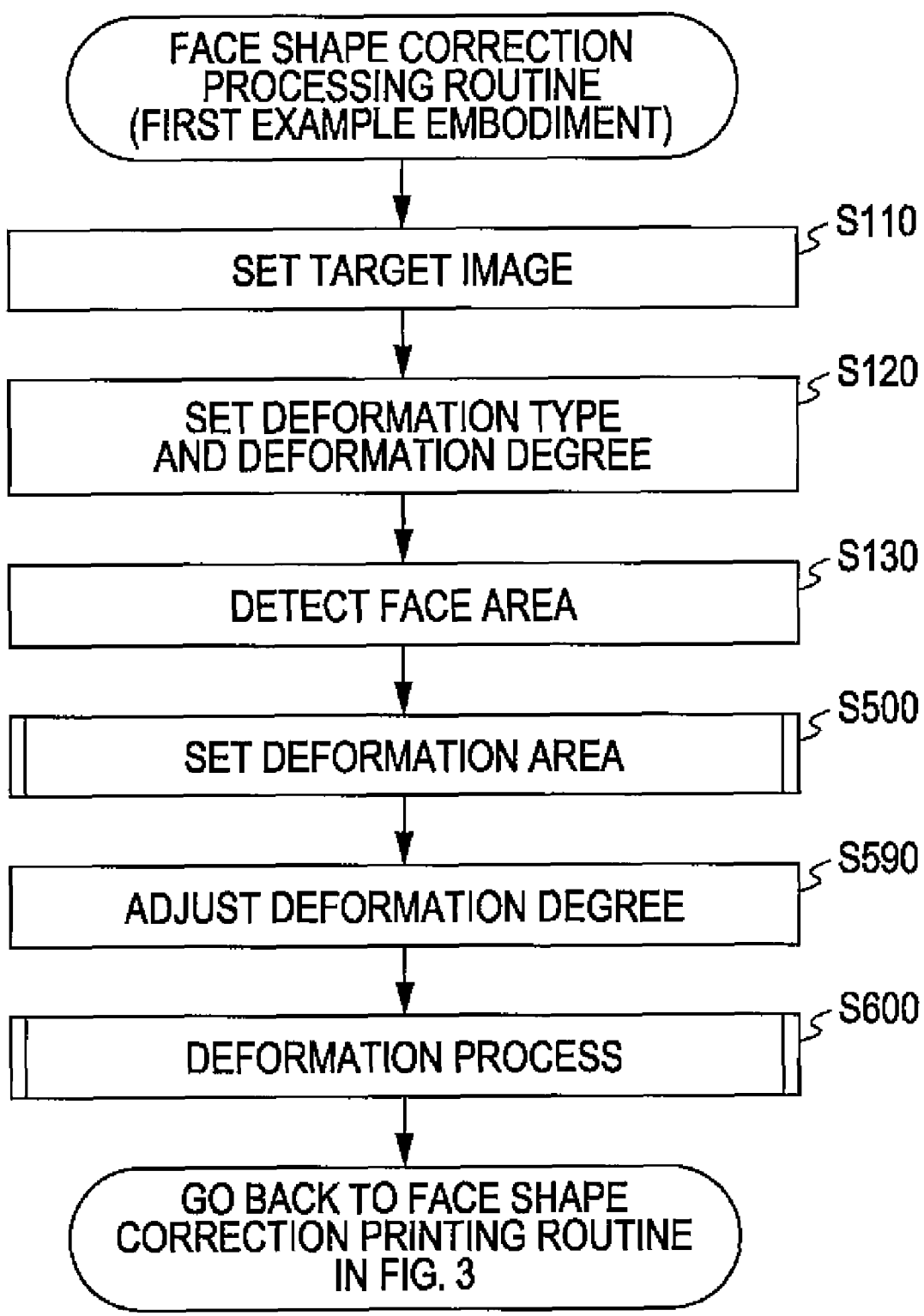
FIG. 4 is a flowchart of a face shape correction processing routine.

FIG. 4 is a flowchart of a face shape correction processing routine executed in step S100 in FIG. 3. In step S110, the face shape correction unit 200 (FIG. 1) sets a target image on which the face shape correction process is executed. The face shape correction unit 200 sets the image corresponding to the thumbnail image TN1, which is selected by a user through the user interface shown in FIG. 2, as the target image. The image data of the set target image are acquired by the printer 100 from the memory card MC through the card interface 170 and are stored in a predetermined area of the internal memory 120. Image data that is acquired from the memory card MC and stored in the internal memory 120 of the printer 100 as described above is hereinafter also termed "original image data". In addition, the image represented by the original image data is also termed "original image".

In step S120 (FIG. 4), the deformation mode setting unit 210 (FIG. 1) sets the type of image deformation and the degree of image deformation for face shape correction. The deformation mode setting unit 210 instructs the display processing unit 310 to display a user interface, with which the type and degree of image deformation are set, on the display unit 150, selects the type and degree of image deformation that are specified by the user through the user interface, and then sets the type and degree of image deformation used for process.

Figure 5:
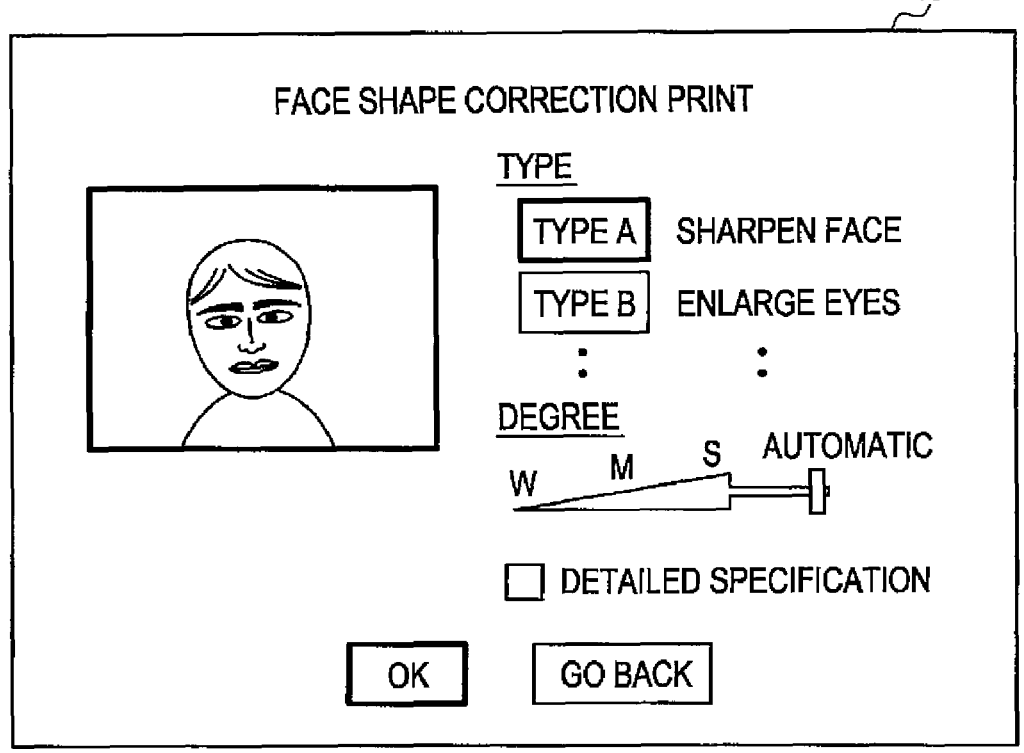
FIG. 5 is a view that illustrates one example of a user interface used for setting the type and degree of image deformation.

FIG. 5 illustrates one example of a user interface for setting the type and degree of image deformation. As shown in FIG. 5, this user interface includes an interface for setting the type of image deformation. In the first example embodiment, for example, a deformation type "type A" in which the shape of a face is sharpened, a deformation type "type B" in which the shape of each eye is enlarged, and the like, are set in advance as choices. The user specifies the type of image deformation using this interface. The deformation mode setting unit 210 sets the image deformation type, which is specified by the user, as an image deformation type used for actual process.

In addition, the user interface shown in FIG. 5 includes an interface for setting the degree (extent) of image deformation. As shown in FIG. 5, in the first example embodiment, the degree of image deformation is set in advance as four choices of three steps Strong (S), Middle (M) and Weak (W), and Automatic. The user specifies the degree of image deformation using this interface. When any one of the three choices, Strong, Middle, and Weak, is specified, the deformation mode setting unit 210 sets the degree of image deformation, which is specified by the user, as the degree of image deformation used for the actual process. When "Automatic" is specified, the degree of image deformation is automatically adjusted by the deformation amount adjustment unit 290 (FIG. 1). A checkbox provided on the user interface is checked when a user desires to specify the deformation mode in detail.

In the following description, it is assumed that the deformation type "type A" in which the shape of a face is sharpened is set as the type of image deformation, the degree "Automatic" is set as the degree of image deformation, and a detailed specification is not desired by the user.

In step S130 (FIG. 4), the face area detection unit 220 (FIG. 1) detects a face area in the target image. Here, the face area means an image area on the target image and an area that includes at least part of an image of a face. The detection of the face area by the face area detection unit 220 is executed by a known face detection method such as, for example, a method through pattern matching using templates (refer to JP-A-2004-318204).

Figure 6:
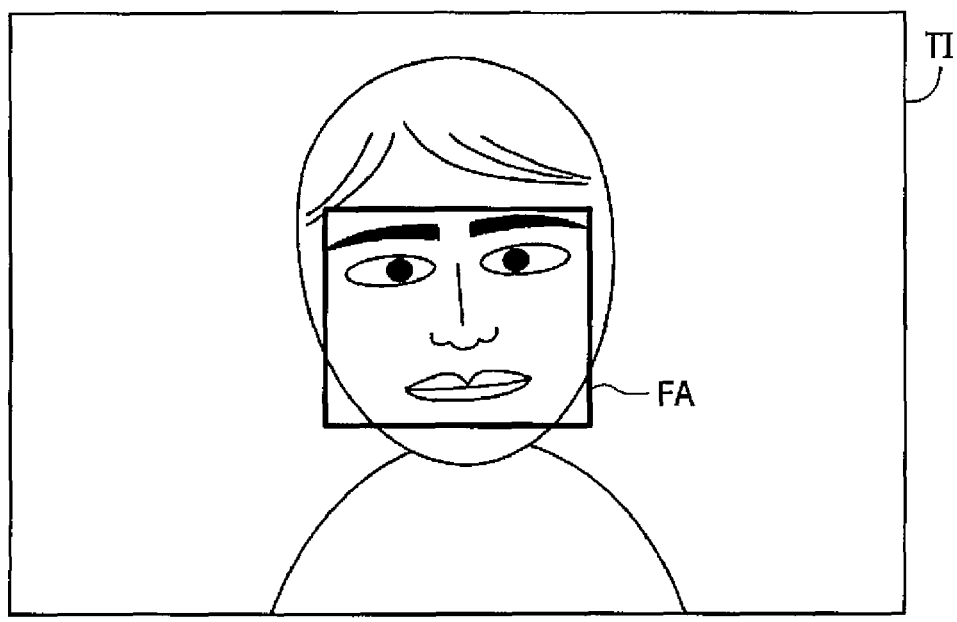
FIG. 6 is a view that illustrates one example of the detection result of a face area.

FIG. 6 illustrates one example of the detection result of the face area. In FIG. 6, a person is included in a target image TI. Therefore, through face detection in step S130, a face area FA is detected in correspondence with the person from the target image TI. As shown in FIG. 6, this face area is a rectangular area that includes both eyes, a nose and a mouth.

In the detection of the face area in step S130, when the face area is not detected, the user is notified to that effect through the display unit 150. In this case, normal printing that does not accompany face shape correction may be performed. Alternatively, a detection process to detect the face area may be performed again using another face detection method.

Note that, in step S130, a face is detected from the target image through pattern matching using templates. The known face detection method, such as a method through pattern matching using templates, generally does not minutely detect the position or inclination (angle) of the entire face or portions of a face (eyes, a mouth, or the like) but sets an area, in which it may be regarded that the image of a face is substantially included in the target image, as the face area.

In step S500, the printer 100 sets an area (deformation area) on which an image deformation process for face shape correction is performed on the basis of the detected face area. Specifically, in order to achieve natural and desirable face shape correction, position adjustment and inclination adjustment are performed on the face area that has been detected in step S130 to thereby set a deformation area. By setting the deformation area in this manner, the image of a face that generally highly attracts viewer's attention is prevented from being unnaturally deformed depending on the relationship in position and/or angle between the set deformation area and the image of a face. The method of setting a deformation area will be described in detail later in the description of setting of a deformation area.

Figure 7:
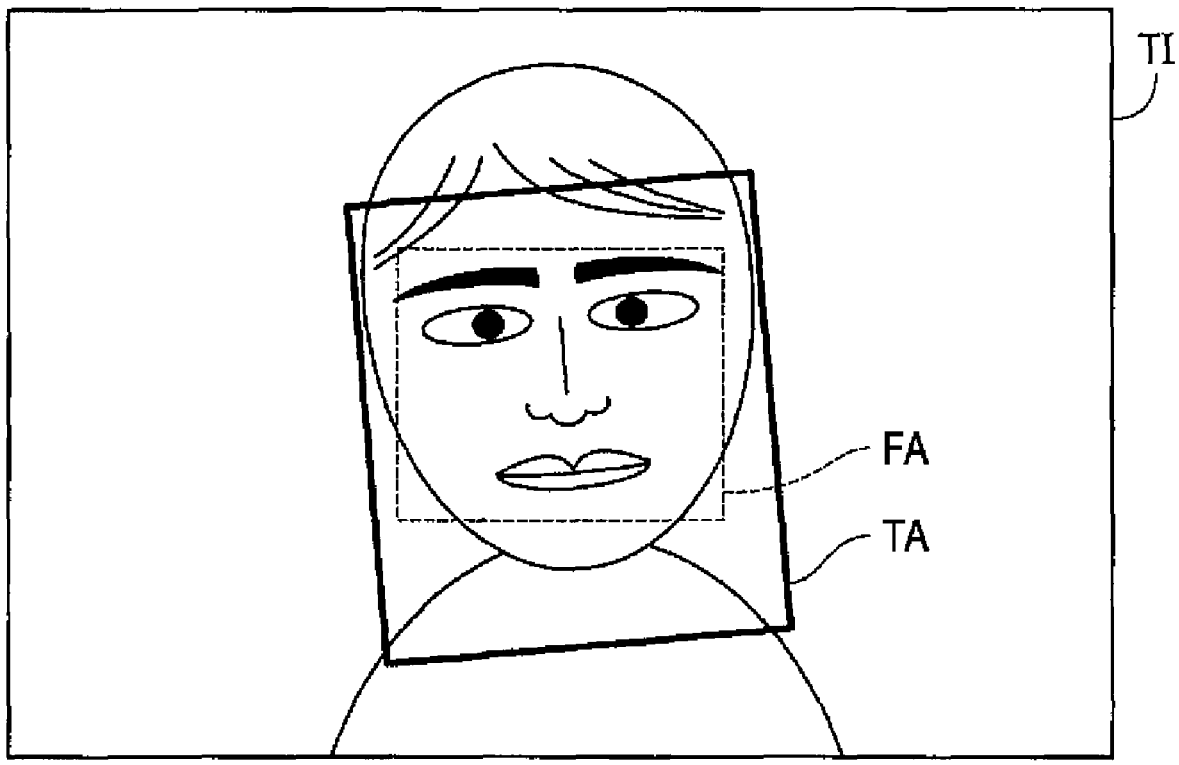
FIG. 7 is a view that illustrates the setting result of a deformation area.

FIG. 7 illustrates the setting result of the deformation area in step S500. The broken line in FIG. 7 indicates the face area FA that is detected from the target image TI in step S130. The wide line in FIG. 7 indicates the deformation area that is set with respect to the face area FA. As shown in FIG. 7, in step S500, the deformation area TA corresponding to this face area FA is set.

In step S590 of FIG. 4, the deformation amount adjustment unit 290 (FIG. 1) adjusts the degree of deformation (also referred to as the deformation quantity). This adjustment will be described in detail later.

In step S600, the deformation process is performed on the deformation area that has been set in step S500. In step S600 of the first example embodiment, the deformation process is executed in such a manner that the deformed image in the deformation area is made as an image obtained by performing the deformation process on the original image. The specific content of the deformation process will be described in detail in the description of the face shape process later. After the deformation process, the control goes back to the face shape correction printing routine shown in FIG. 3.

Figure 8A:
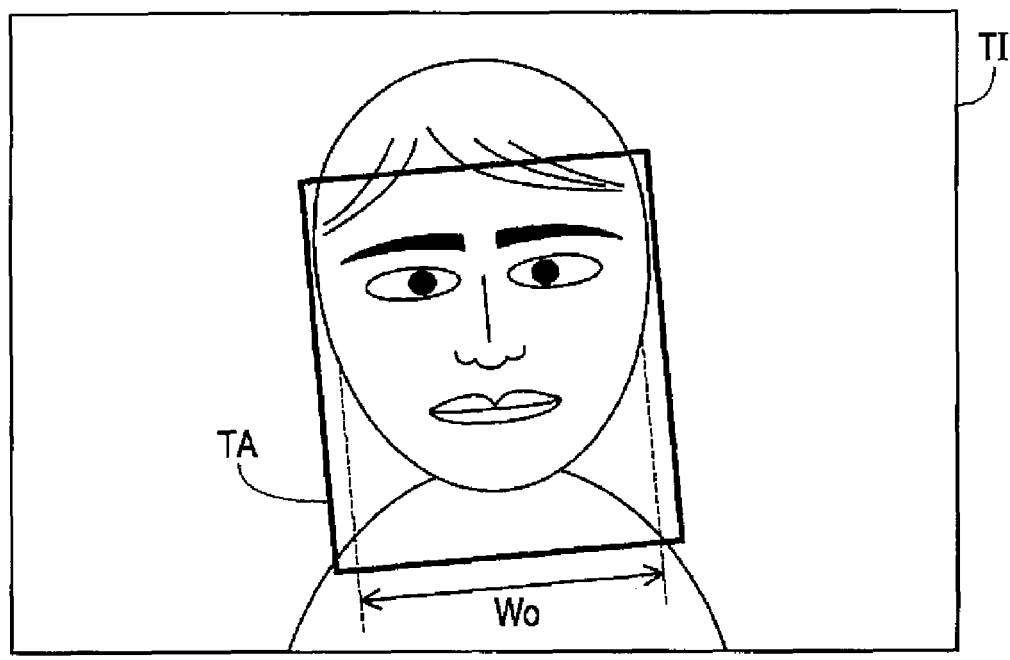
FIG. 8A and FIG. 8B are views, each of which illustrates the result after deformation process has been performed.
Figure 8B:
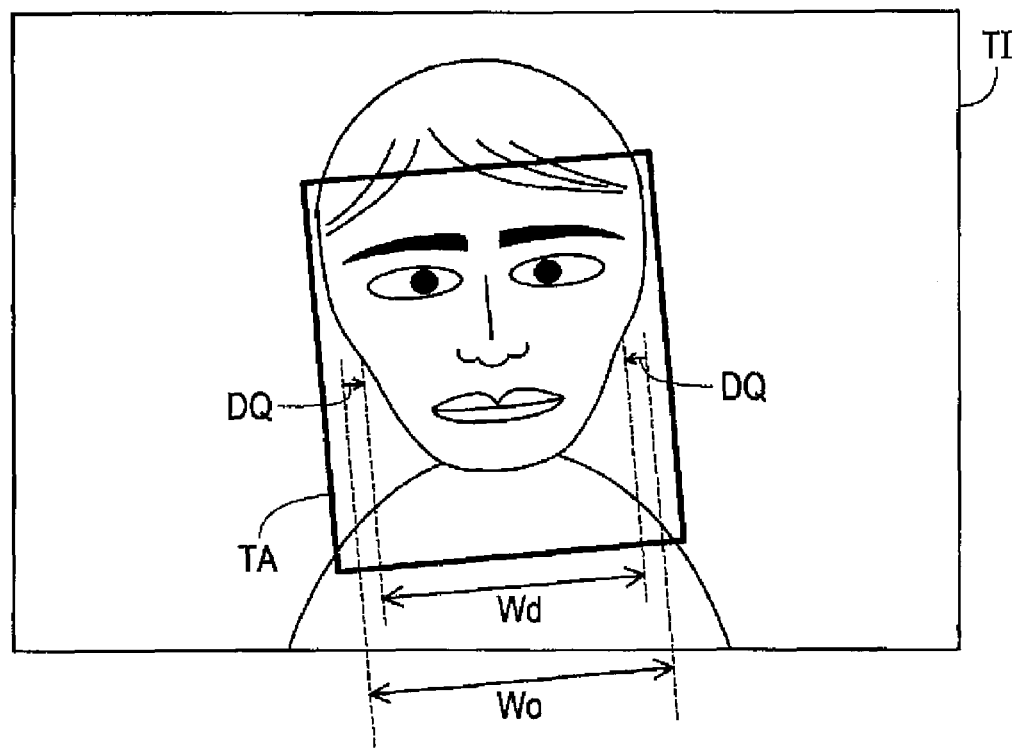

FIG. 8A and FIG. 8B illustrate the result after deformation process has been performed. FIG. 8A shows the state before the deformation process is performed in step S600 of FIG. 4. The deformation process is only performed on the deformation area TA. In the target image TI, shown in FIG. 8B, on which the deformation process has been performed, the face of a person in the deformation area TA is narrowed. As will be described later, an area outside the deformation area TA is not deformed. As a result, it is possible to deform the subject without excessively deforming the entire image.

In the example of FIG. 8A and FIG. 8B, the lines of the right and left cheeks of the face (contour of the face) is moved inwardly by the deformation quantity DQ. Deformation quantity DQ is adjusted in step S590 of FIG. 4. Through the above deformation, the width Wd of the deformed face is narrowed twice the deformation quantity DQ in comparison with the width Wo of the face that has not yet deformed. The reason why the image is deformed so that the width is narrowed in this way is to approximate the impression of the subject obtained by observing the image to the impression obtained by observing the actual subject.

Figure 9:
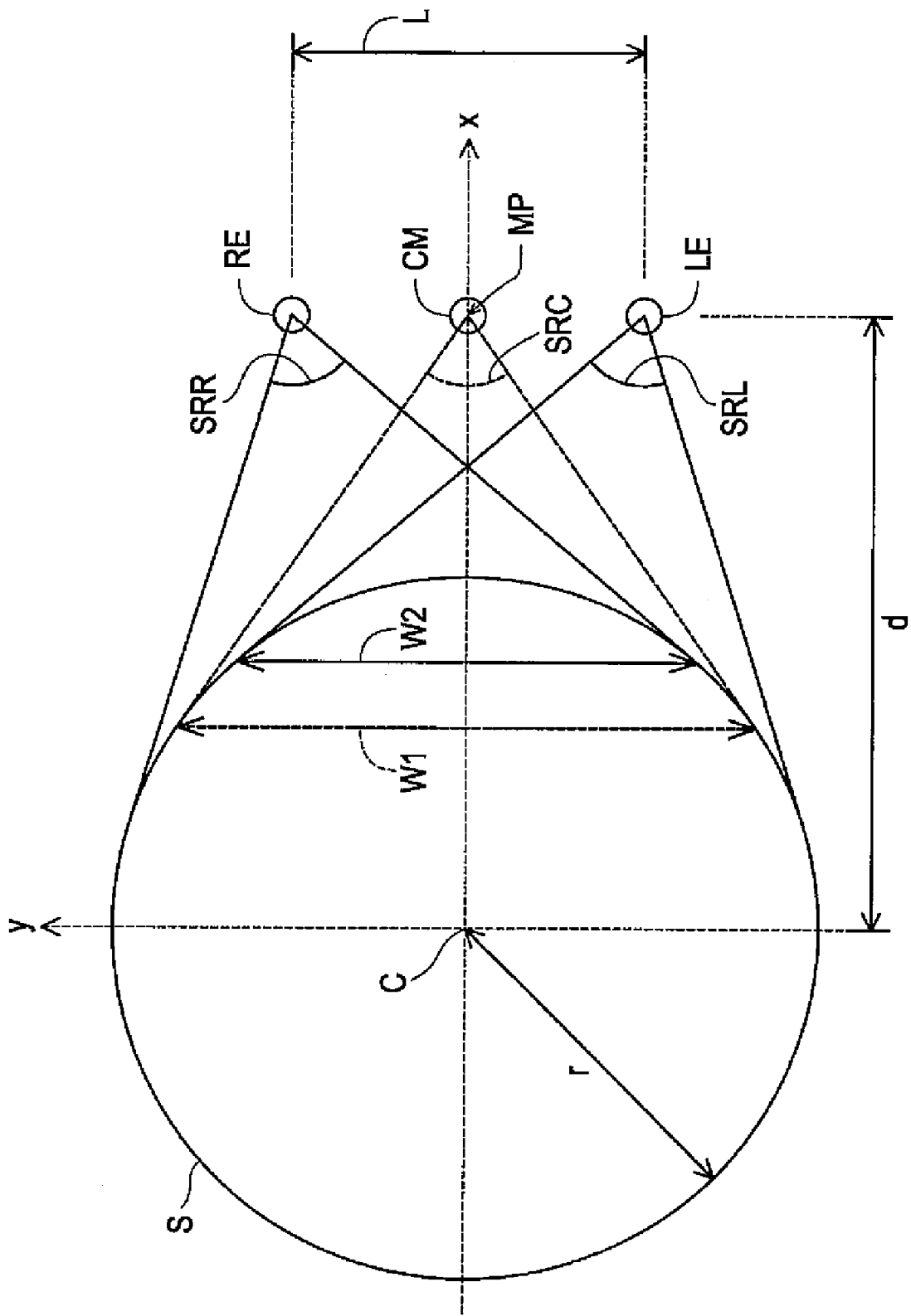
FIG. 9 is a view that illustrates a difference in impression of a subject.

FIG. 9 illustrates a difference in impression of a subject. In the drawing, a subject S, the right eye RE and left eye LE of a person (observer) and a camera CM are shown. This drawing shows a positional relationship as viewed from the upper side of the observer.

In the example of FIG. 9, for ease of description, it is assumed that the shape of the subject S as viewed from the upper side is a circle having a radius r. Such a circular subject S is not limited to the head of a person but may be various subjects (for example, a cylindrical building). The subject S is located in front of two eyes RE and LE. The camera CM is arranged at the middle point MP of two eyes RE and LE. That is, the camera CM views the subject S from substantially the same position as the observer. The x-axis in the drawing is a coordinate axis that extends through the center C of the subject S and the middle point MP. The y-axis is a coordinate axis that extends through the center C and is perpendicular to the x-axis. Two eyes RE and LE are aligned along the y-axis. The distance L indicates a distance between the two eyes RE and LE. In addition, the distance d indicates a distance between the center C and the eyes RE and LE along the x-axis.

The first width W1 in the drawing indicates the width of the subject S. The first width W1 indicates the width of a portion that is viewable from the camera CM. The portion that is viewable from the camera CM is a portion in a camera subject range SRC on the surface of the subject S. The camera subject range SRC indicates a range in which the subject S occupies within the entire range of visual field of the camera CM.

The second width W2 in the drawing also shows the width of the subject S. However, this second width W2 indicates the width of a portion that is viewable from both eyes RE and LE. The portion viewable from both eyes RE and LE is a portion of the range in which the right subject range SRR and the left subject range SRL overlap each other on the surface of the subject S. The right subject range SRR indicates a range in which the subject S occupies within the entire range of visual field of the right eye RE, and the left subject range SRL indicates a range in which the subject S occupies within the entire range of visual field of the left eye LE.

As shown in the drawing, a viewable portion of the subject S differs between the right eye RE and the left eye LE. That is, a portion viewable from the right eye RE is deviated to the right eye RE side, and a portion viewable from the left eye LE is deviated to the left eye LE side. In such a case, it may be presumed that recognition of the subject S by a person (observer) is strongly influenced from a visible portion that is common to both eyes RE and LE. For example, it is estimated that a person may recognize the width W2 of a visible portion that is common to both eyes RE and LE as the width of the subject S.

In addition, as shown in the drawing, the second width W2 is narrower than the first width W1. That is, when the image generated by photographing is observed, a person receives an impression that the width is wide in comparison with the width when the actual subject S is observed. Then, by deforming the image so as to narrow the width as shown in FIG. 8B, it is possible to approximate the impression of the subject obtained by observing the image to the impression obtained by observing the actual subject.

Figure 10:
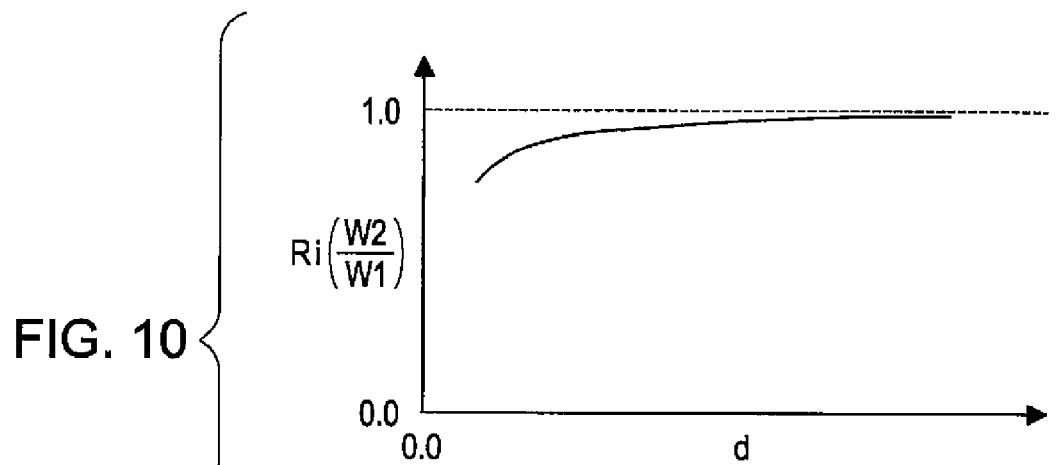
FIG. 10 is a graph that shows the relationship between a distance and a ratio of a second width to a first width.

FIG. 10 is a graph that shows the relationship between the distance d and a ratio Ri of the second width W2 to the first width W1. The abscissa axis represents the distance d, and the ordinate axis represents the ratio Ri. In addition, FIG. 10 also shows the functions that represent the widths W1 and W2. Widths W1 and W2 are expressed by the functions of radius r, distance d and distance L. In the graph of FIG. 10, the radius r and the distance L are fixed.

As shown in the drawing, the ratio Ri (W2/W1) decreases as the distance d decreases. In addition, the ratio Ri (W2/W1) is smaller than "1.0" and is approximated to "1.0" as the distance d increases.

Figure 11A:
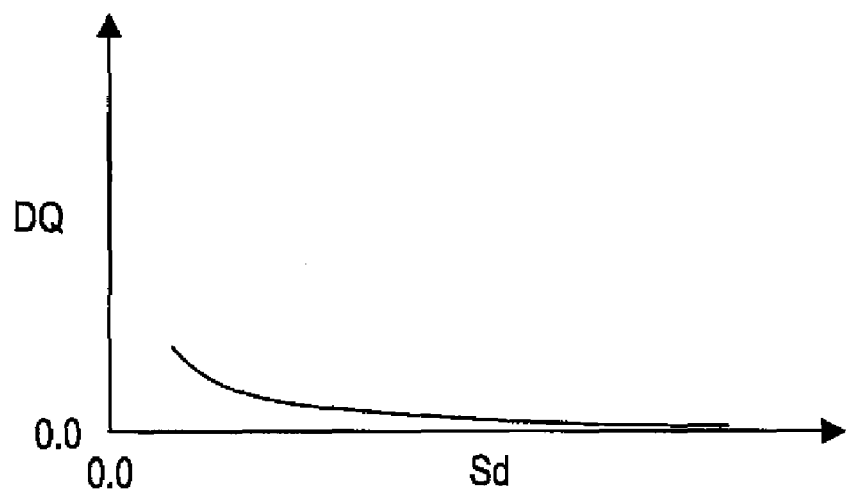
FIG. 11A is a graph that shows the relationship between a deformation quantity and a subject distance.
Figure 11B:
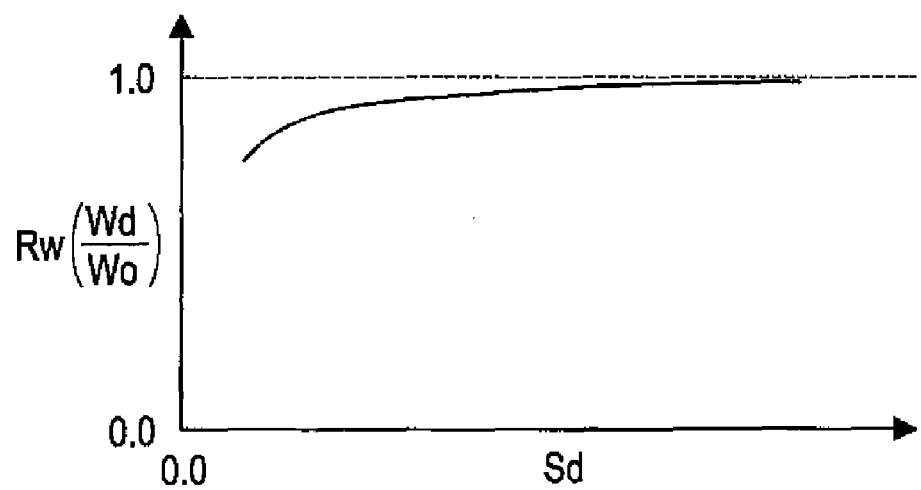
FIG. 11B is a graph that shows the relationship between a ratio Rw and the subject distance.

FIG. 11A is a graph that shows the relationship between the deformation quantity DQ and the subject distance Sd. FIG. 11B is a graph that shows the relationship between the subject distance Sd and the ratio Rw of the width Wd after deformation to the width Wo before deformation. In these graphs, the abscissa axis represents the subject distance Sd.

The subject distance Sd indicates a distance between the subject and a photographic device when the target image TI is photographed. The subject distance Sd is stored as history information in an image file that stores image data representing the target image TI. The format of a data file that stores the above image data and history information uses, for example, an Exif (Exchangeable Image File Format). In this example embodiment, such an Exif data file is supplied from the memory card MC (FIG. 1) to the printer 100. The history information is usually set by the photographic device (for example, a digital still camera).

The deformation quantity DQ shown in FIG. 11A is set in advance so that the ratio Rw shown in FIG. 11B is equal to the ratio Ri shown in FIG. 10. As a result, the deformation quantity DQ is set to a larger value as the subject distance Sd is reduced. Here, the distance L and the radius r are fixed to a predetermined value in advance. The distance L between the eyes may use, for example, 0.1 m. In addition, the radius r, that is, the size of the subject S may use a value (for example, 0.1 m) that represents the subject. In this example embodiment, the deformation quantity DQ indicates the rate of change (in this case, the rate of reduction) in width in the deformation area TA.

In step S590 of FIG. 4, the deformation amount adjustment unit 290 (FIG. 1) acquires the subject distance Sd from the history information that is associated with the target image TI and then determines the deformation quantity DQ from the subject distance Sd. The correspondence relationship between the deformation quantity DQ and the subject distance Sd is set in advance as shown in FIG. 11A. The subject distance Sd corresponds to a "distance parameter" as recited in the appended claims. In step S600 of FIG. 4, the image is deformed (FIG. 8B) using the deformation quantity DQ that is determined as described above. As a result, it is possible to appropriately deform the image in conformity to the distance. Specifically, it is possible to approximate the impression of the subject obtained by observing the image to the impression obtained by observing the actual subject.

Figure 12:
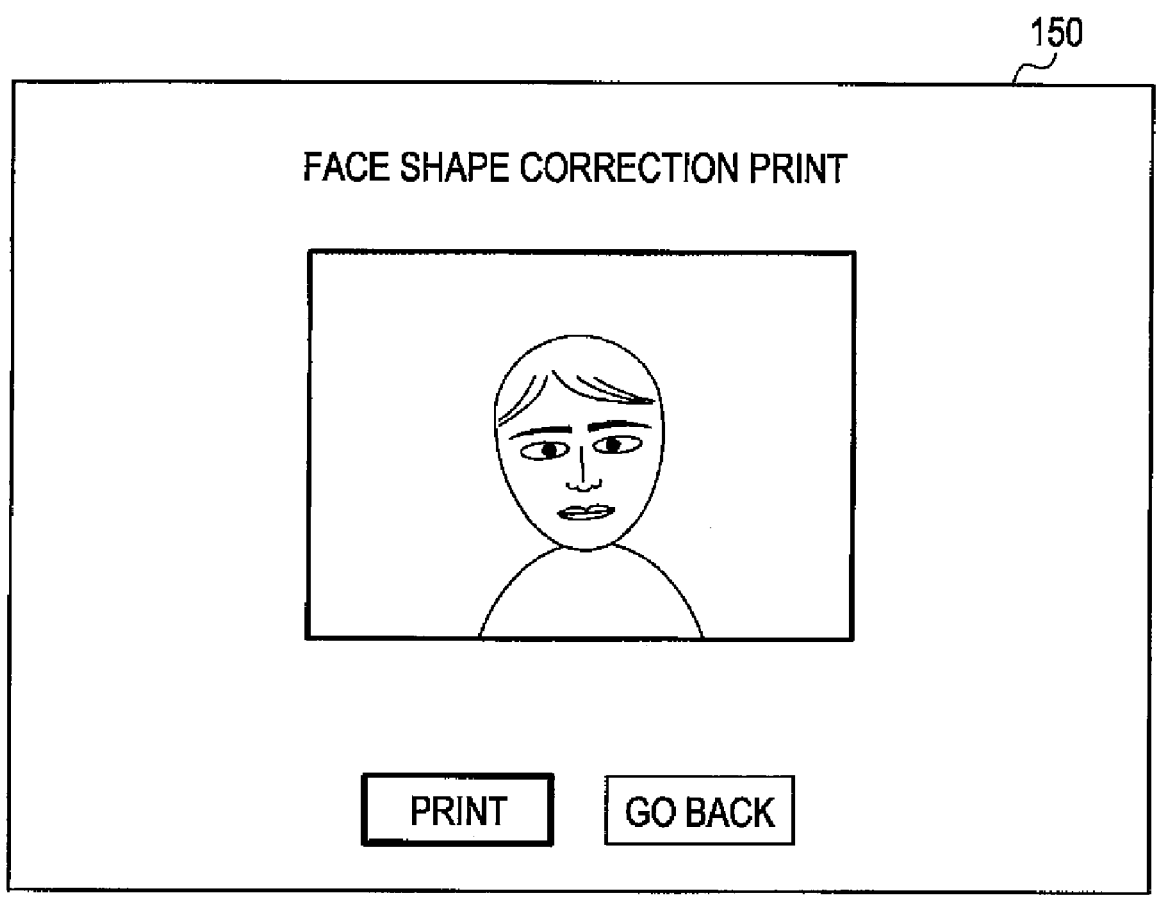
FIG. 12 is a view that illustrates one example of the state of a display unit on which a target image obtained after face shape correction is displayed.

When the control goes back from the face shape correction processing routine of FIG. 4, in step S200 of FIG. 3, the image (corrected image) on which the deformation process has been performed is displayed. Specifically, the face shape correction unit 200 (FIG. 1) instructs the display processing unit 310 to make the display unit 150 display the target image on which the face shape correction has been executed. FIG. 12 illustrates one example of the state of the display unit 150 on which the target image TI obtained after face shape correction is displayed. Using the display unit 150 on which the target image TI, on which the face shape correction has been executed, is displayed, a user is able to confirm the result of the correction. When the user is not satisfied with the correction result and selects the "GO BACK" button, for example, the screen to select a deformation type and a deformation degree, shown in FIG. 5, is displayed on the display unit 150. The user then resets the deformation type and the deformation degree. When the user is satisfied with the correction result and selects the "PRINT" button, the following corrected image printing process is initiated.

In step S300, the print processing unit 320 (FIG. 1) controls the printer engine 160 to print out the target image on which the face shape correction process has been executed. The print processing unit 320 executes a process, such as a resolution conversion or halftone process, on the image data of the target image on which the face shape correction process has been executed to thereby generate print data. The generated print data are supplied from the print processing unit 320 to the printer engine 160, and the printer engine 160 prints out the target image. In this manner, printing of the target image on which the face shape correction has been executed is completed.

B. Second Example Embodiment

Figure 13A:
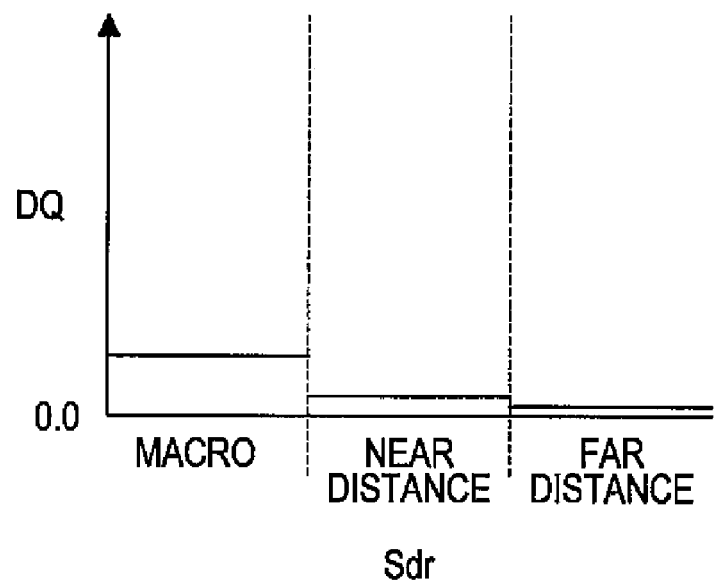
FIG. 13A is a graph that shows the deformation quantity and FIG. 13B is a graph that shows the ratio Rw according to a second example embodiment of the invention.

FIG. 13A is a graph that shows the deformation quantity DQ according to a second example embodiment of the invention. The second example embodiment differs from the first example embodiment of FIG. 11A only in that the deformation quantity DQ is determined on the basis of a subject distance range Sdr in place of the subject distance Sd.

The subject distance range Sdr shows the distance, when the target image TI is photographed, between the photographic device and the subject in three steps "Macro", "Near Distance" and "Far Distance". The subject distance range Sdr, as well as the subject distance Sd, is stored in the image file as history information. Some photographic devices set the subject distance range Sdr without setting the subject distance Sd. In the second example embodiment, it is possible to use an image file that is generated by such photographic devices.

In the graph of FIG. 13A, the abscissa axis represents the subject distance range Sdr, and the ordinate axis represents the deformation quantity DQ. The deformation quantity DQ, as well as that of the first example embodiment of FIG. 11A, is set in advance so as to increase as the distance is shorter.

Figure 13B:
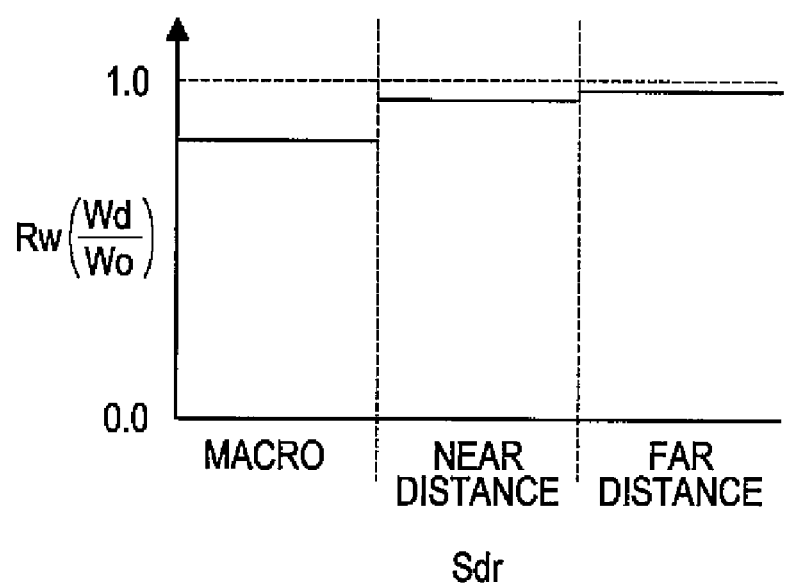

FIG. 13B is a graph that shows the relationship between the ratio Rw (the width Wd after deformation/the width Wo before deformation) and the subject distance range Sdr. The abscissa axis represents the subject distance range Sdr, and the ordinate axis represents the ratio Rw. In this example embodiment, the deformation amount adjustment unit 290 determines the deformation quantity DQ from the subject distance range Sdr in accordance with the correspondence relationship shown in FIG. 13A. Thus, as the distance becomes shorter, the ratio Rw decreases. As a result, it is possible to approximate the impression of the subject obtained by observing an image to the impression obtained by observing the actual subject. The correspondence relationship between the deformation quantity DQ and the subject distance range Sdr is desirably set so that the ratio Rw becomes a value close to the ratio Ri shown in FIG. 10. The subject distance range Sdr corresponds to a "distance parameter" in the appended claims.

C. Third Example Embodiment

Figure 14:
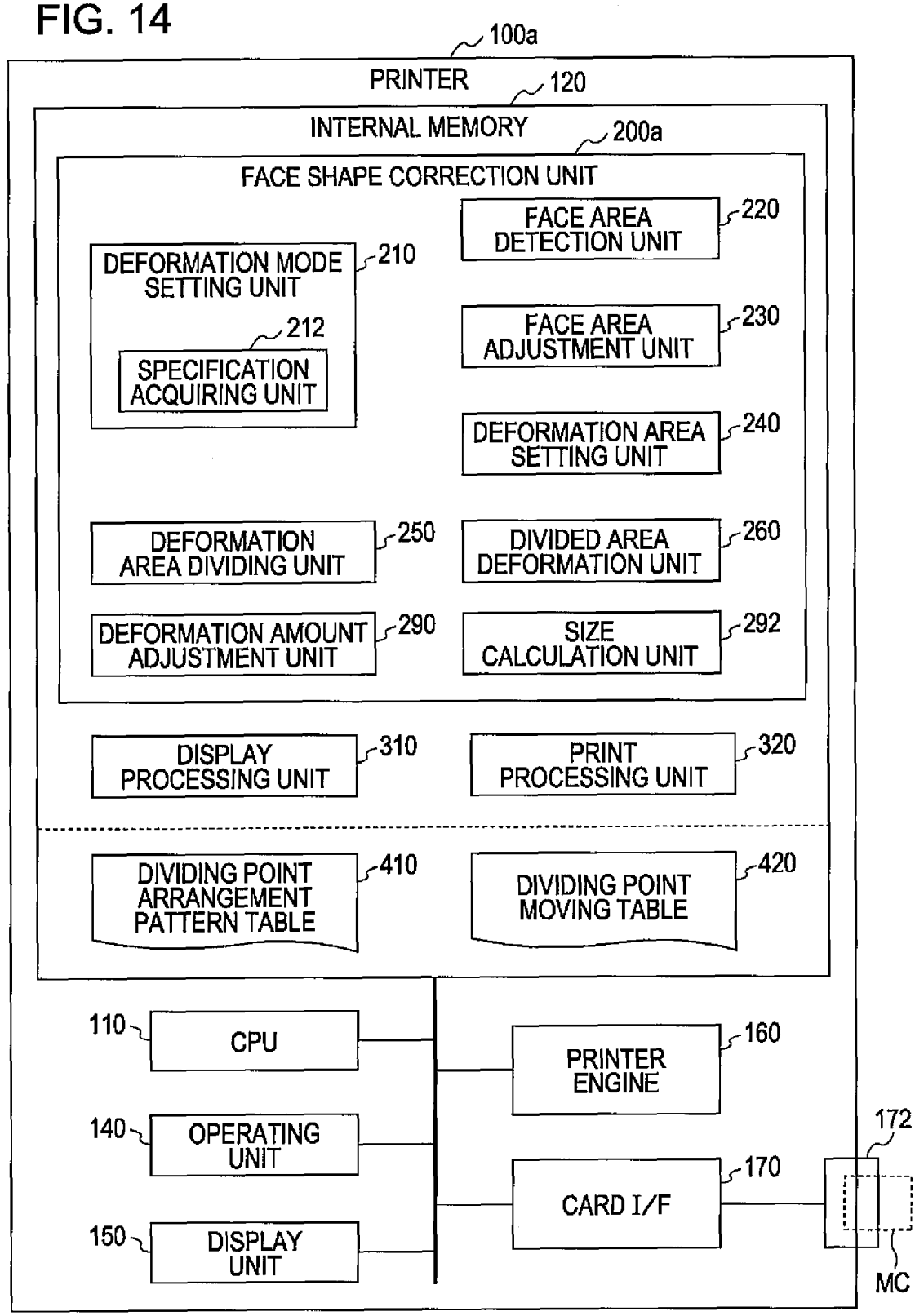
FIG. 14 is a block diagram of a printer according to a third example embodiment of the invention.

FIG. 14 is a block diagram of a printer 100a according to a third example embodiment of the invention. The printer 100a differs from the printer 100 of FIG. 1 in that a size calculation unit 292 is additionally provided in a face shape correction unit 200a. The remaining configuration is the same as that of the printer 100 of FIG. 1.

Figure 15:
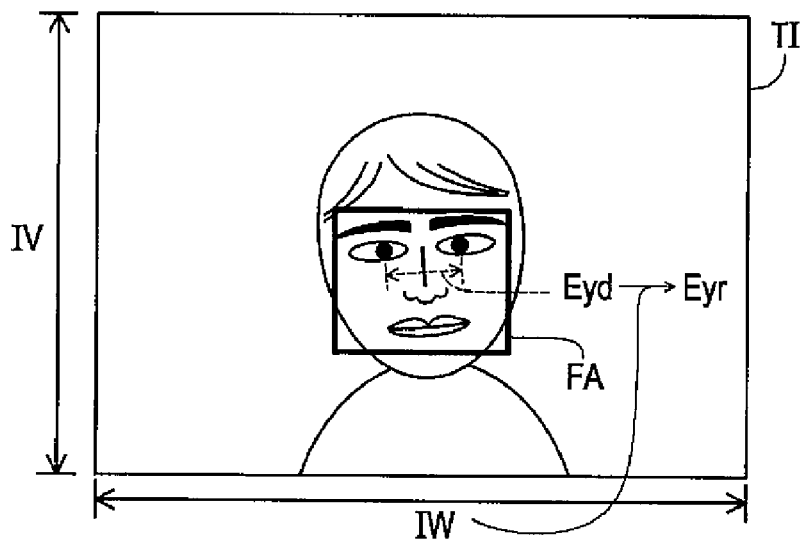
FIG. 15 is a schematic view that shows a size calculated by a size calculation unit (FIG. 14).

FIG. 15 shows a size calculated by the size calculation unit 292 (FIG. 14). In this example embodiment, the face shape correction process is executed in accordance with the procedure of FIG. 4. However, as is different from the above described example embodiments, in step S590, the size calculation unit 292 first calculates the size of the subject on the target image TI. The deformation amount adjustment unit 290 then uses the calculated size to adjust the deformation quantity DQ. The processes of the other steps in FIG. 4 are the same as those of the above described example embodiments.

In this example embodiment, a face is used as the subject. The size calculation unit 292 then calculates the size using a distance between two eyes. The size calculation unit 292 first detects two eyes from the face area. The method of detecting eyes may employ, for example, known various methods, such as a method through pattern matching using templates. Next, the size calculation unit 292 calculates a distance Eyd between the detected two eyes. The calculated distance Eyd is represented by the number of pixels. Next, the size calculation unit 292 calculates the size Eyr of the subject relative to the size of the target image TI. In this example embodiment, the relative size Eyr is a value obtained by dividing the distance Eyd by the larger one of the number of pixels IW in the width direction of the target image TI and the number of pixels IV in the height direction thereof (in the example of FIG. 15, the number of pixels IW in the width direction). The relative size Eyr indicates the size of the subject on the target image TI, which is not dependent on the density of pixel of the target image TI.

The relative size Eyr increases as the distance, when photographing, between the photographic device and the subject becomes shorter. That is, the relative size Eyr may be used as a parameter that represents the distance. The deformation amount adjustment unit 290 then determines the deformation quantity DQ using this relative size Eyr. Variation in distance between two eyes (that is, relative size Eyr) among people is sufficiently small as compared with variation in relative size Eyr due to the change in distance between the subject and the photographic device. Thus, the relative size Eyr may be used as a common parameter of distance that is not dependent on a person.

Figure 16A:
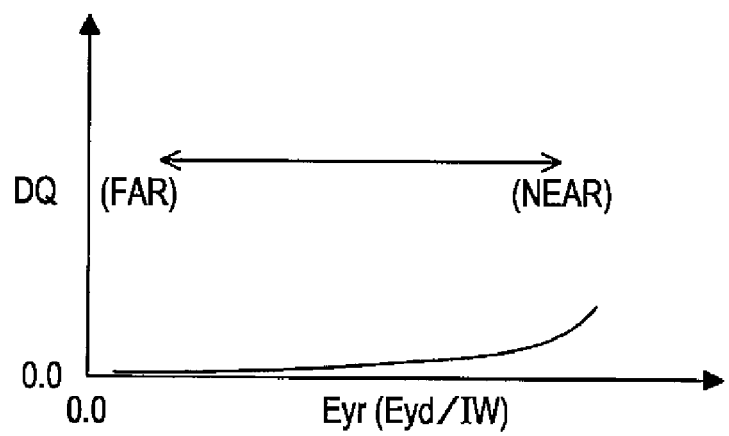
FIG. 16A is a graph that shows the deformation quantity and FIG. 16B is a graph that shows the ratio Rw according to the third example embodiment.

FIG. 16A is a graph that shows the deformation quantity DQ. The abscissa axis represents the relative size Eyr, and the ordinate axis represents the deformation quantity DQ. This deformation quantity DQ is set in advance so as to increase as the relative size Eyr increases. That is, the deformation quantity DQ is set so as to increase as the distance, when photographing, between the photographic device and the subject becomes shorter.

Figure 16B:
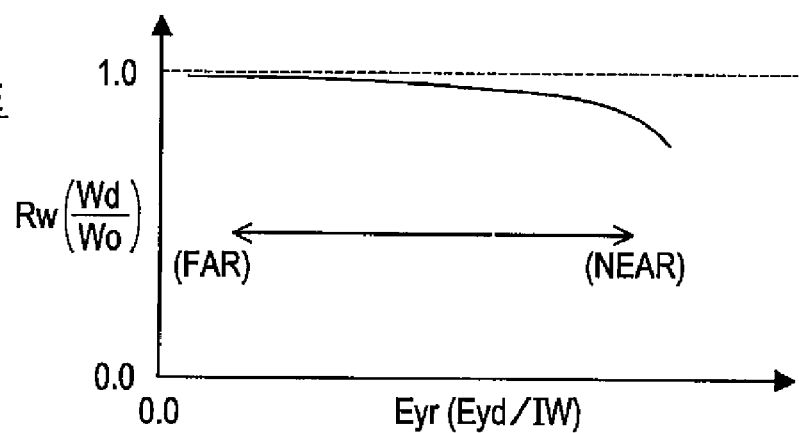

FIG. 16B is a graph that shows the relationship between the ratio Rw (the width Wd after deformation/the width Wo before deformation) and the relative size Eyr The abscissa axis represents the relative size Eyr, and the ordinate axis represents the ratio Rw. In this example embodiment, the deformation amount adjustment unit 290 determines the deformation quantity DQ from the relative size Eyr in accordance with the correspondence relationship shown in FIG. 16A. Thus, as the distance becomes shorter, the ratio Rw decreases. As a result, it is possible to approximate the impression of the subject obtained by observing an image to the impression obtained by observing the actual subject. The correspondence relationship between the deformation quantity DQ and the relative size Eyr is desirably set so that the ratio Rw becomes a value close to the ratio Ri shown in FIG. 10. The relative size Eyr corresponds to a "distance parameter" as recited in the appended claims.

As described above, in the third example embodiment, the distance parameter is calculated by analyzing the target image TI. As a result, even when both the subject distance Sd and the subject distance range Sdr cannot be used, it is possible to appropriately deform the image in conformity to the distance.

D. Fourth Example Embodiment

Figure 17:
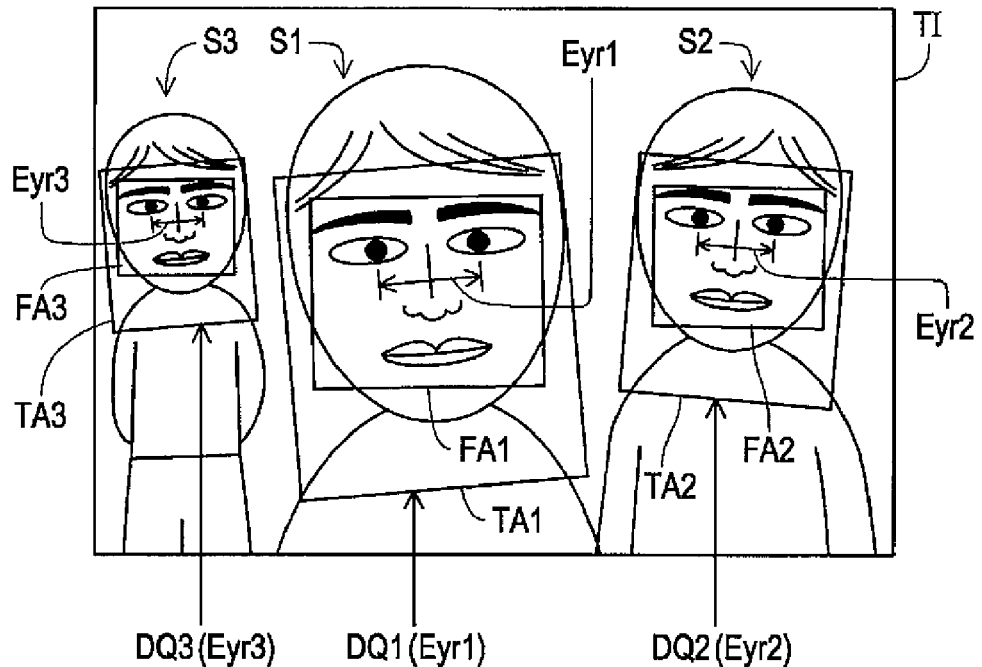
FIG. 17 is a view that schematically illustrates a face shape correction process according to a fourth example embodiment of the invention.

FIG. 17 illustrates a face shape correction process according to a fourth example embodiment of the invention. The fourth example embodiment shows a process when a plurality of subjects are detected from the target image TI in the third example embodiment of FIG. 14 to FIG. 16B.

FIG. 17 shows the target image TI. Three persons S1, S2 and S3 appear in the target image T1. As a result, in step S130 of FIG. 4, three face areas FA1, FA2, and FA3 that respectively correspond to the three persons S1, S2 and S3 are detected. In the next step S500, three deformation areas TA1, TA2 and TA3 that respectively correspond to the three face areas FA1, FA2 and FA3 are set.

In the next step S590 of FIG. 4, the size calculation unit 292 (FIG. 14) calculates three relative sizes Eyr1, Eyr2 and Eyr3 that respectively correspond to three face areas FA1, FA2 and FA3. The deformation amount adjustment unit 290 (FIG. 14), in accordance with the correspondence relationship of FIG. 16A, then determines the deformation quantities DQ1, DQ2 and DQ3 of the respective three deformation areas TA1, TA2 and TA3 from the respective three relative sizes Eyr1, Eyr2 and Eyr3. In step S600, the three deformation areas TA1, TA2 and TA3 are respectively deformed by using the three deformation quantities DQ1, DQ2 and DQ3, each of which is determined for the corresponding area.

The above described process may be executed in the same manner when the number of subjects detected from the target image TI is two, four or more as well.

As described above, in the fourth example embodiment, the deformation quantity DQ is adjusted on a deformation area (that is, subject) basis. As a result, when a plurality of subjects are detected from one target image TI, it is possible to appropriately deform each of the subjects.

E. Fifth Example Embodiment

Figure 18:
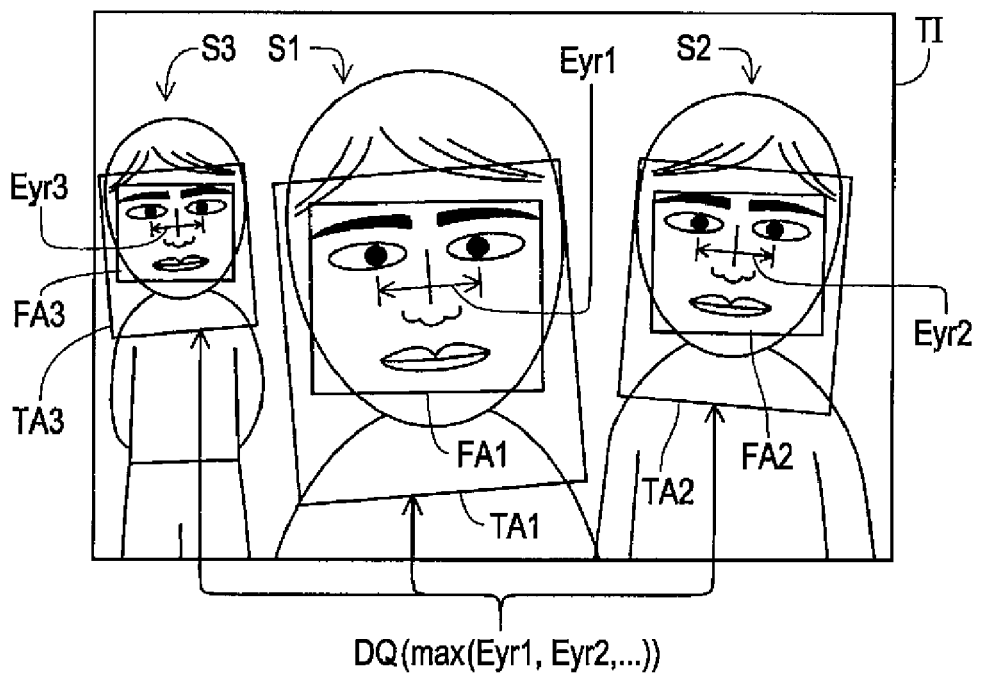
FIG. 18 is a view that schematically illustrates a face shape correction process according to a fifth example embodiment of the invention.

FIG. 18 schematically illustrates a face shape correction process according to a fifth example embodiment of the invention. The fifth example embodiment shows another example of a process when a plurality of subjects are detected from the target image TI in the third example embodiment of FIG. 14 to FIG. 16B.

FIG. 18 shows a case in which the same target image TI is processed. The process of the fifth example embodiment differs from that of the fourth example embodiment of FIG. 17 only in that a common deformation quantity DQ is applied to all the deformation areas. The deformation amount adjustment unit 290 determines the common deformation quantity DQ on the basis of the relative size that is maximum among the relative sizes of the subjects that are detected from the target image TI. In the example of FIG. 18, the deformation quantity DQ is determined on the basis of a first relative size Eyr1 that is maximum among three relative sizes Eyr1, Eyr2 and Eyr3. The above described process may be executed in the same manner when the number of subjects detected from the target image TI is two, four or more as well.

As described above, in the fifth example embodiment, because the deformation quantity is determined on the basis of the maximum size, it is possible to suppress a shortage of the deformation quantity. In addition, because the common deformation quantity is applied to all the deformation areas, it is possible to simplify image processing in comparison with the case in which multiple deformation processes having different deformation quantities are executed.

In the fifth example embodiment, the common deformation quantity DQ is applied to all the deformation areas. Then, the distance parameter used to determine the deformation quantity DQ may employ a parameter such that one value is associated with one target image TI. For example, the subject distance Sd may be used, or the subject distance range Sdr may be used. When a parameter other than the relative size Eyr is employed, the size calculation unit 292 (FIG. 14) may be omitted.

F. Sixth Example Embodiment

Figure 19:
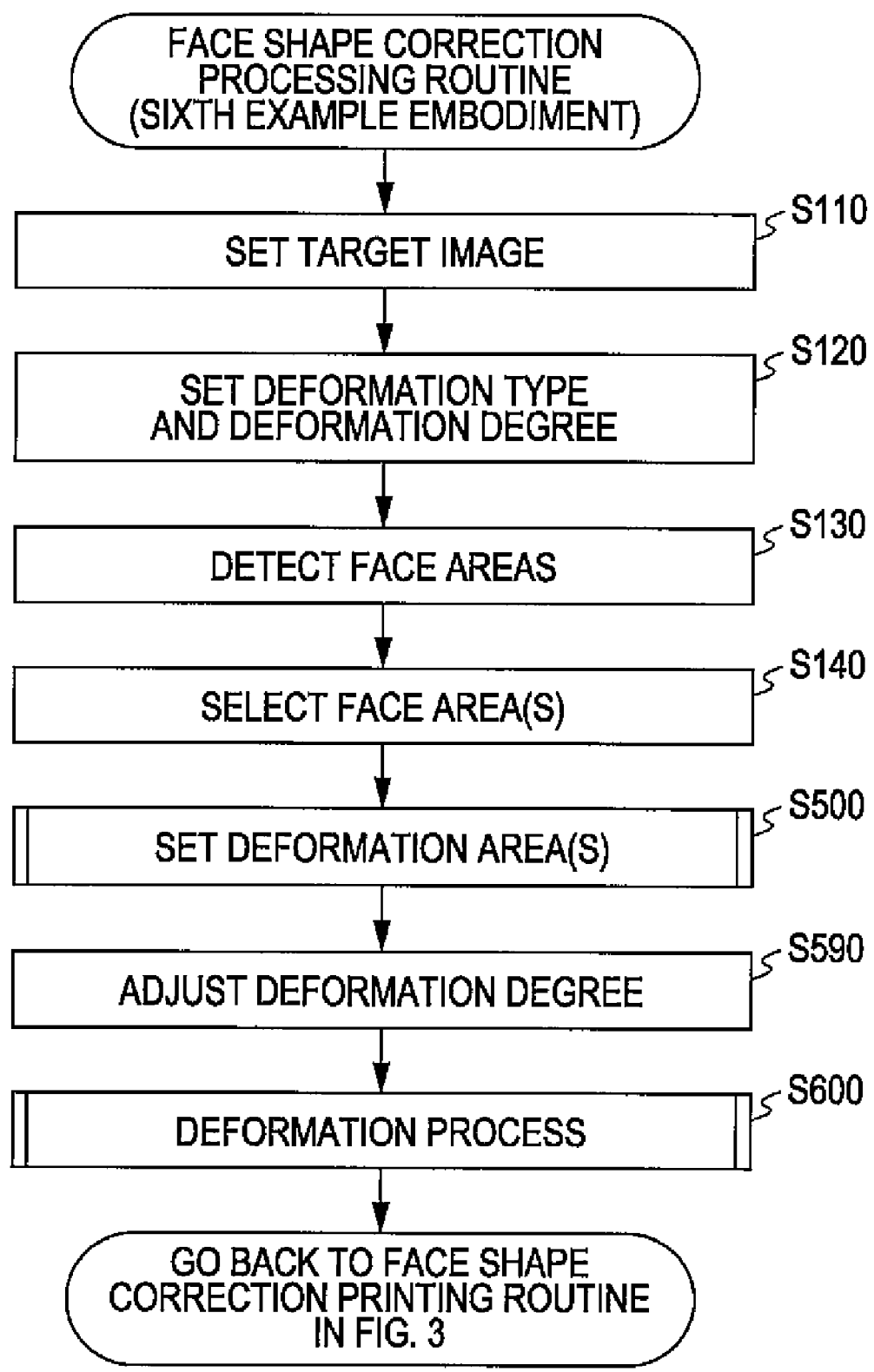
FIG. 19 is a flowchart that shows a face shape correction processing routine according to a sixth example embodiment of the invention.

FIG. 19 is a flowchart of a face shape correction processing routine according to a sixth example embodiment of the invention. The procedure of the sixth example embodiment differs from that shown in FIG. 4 only in that step S140 is additionally provided between step S130 and step S500. The processes of the other steps are executed in the same manner as those of the fifth example embodiment of FIG. 4, FIG. 14 and FIG. 18.

In step S140, the deformation area setting unit 240 (FIG. 14) selects a face or faces that satisfy a predetermined condition when a plurality of face areas (that is, subjects) are detected in step S130. The selected face area(s) is/are used as a target of deformation process. In addition, the deformation area setting unit 240 excludes the face area(s) that is/are not selected from a target of deformation process.

Figure 20:
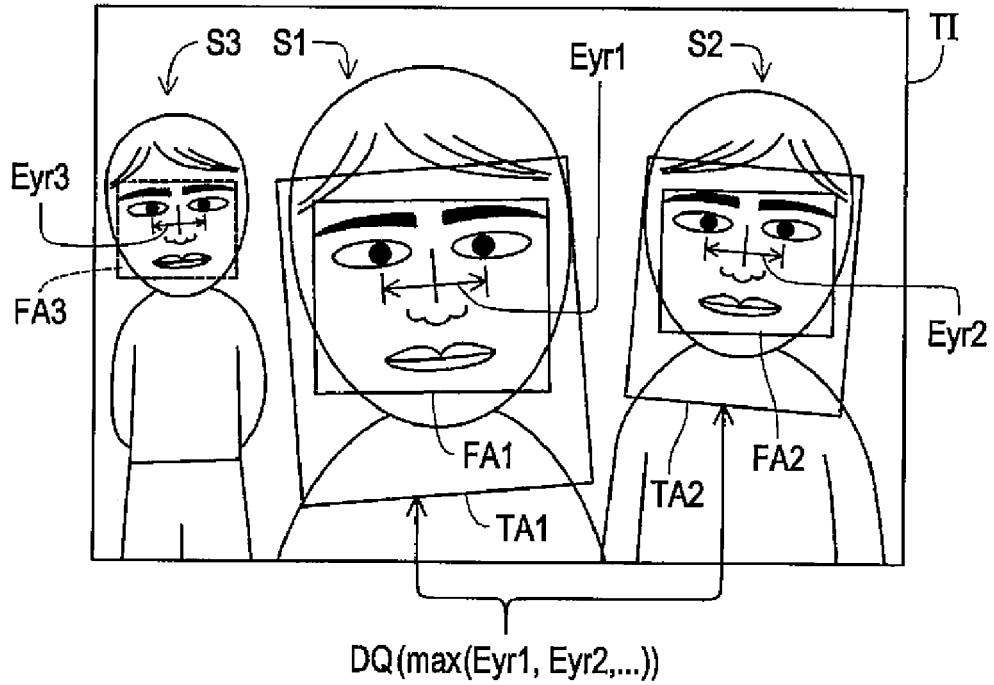
FIG. 20 is a view that schematically illustrates a face shape correction process according to the sixth example embodiment of the invention.

FIG. 20 schematically illustrates a face shape correction process according to the sixth example embodiment. FIG. 20 shows the same target TI as that of FIG. 18. In the sixth example embodiment, a face area having a relative size larger than a given selection threshold value is selected. In this manner, when one or more subjects having a large relative size and one or more subjects having a small relative size are mixedly contained in one target image TI, a portion of subjects having a large relative size is/are selected.

In the sixth example embodiment, the deformation area setting unit 240, on the basis of a maximum relative size, sets a selection threshold value to a value smaller than the maximum relative size. Specifically, a value that is obtained by multiplying the maximum relative size by a predetermined coefficient (for example, 0.8) that is smaller than one is used as a selection threshold value. Here, the maximum relative size means a size that is maximum among the relative sizes of all the subjects detected from the target image TI. The method of setting such a selection threshold value may employ other various methods. For example, the selection threshold value is not necessarily proportional to the maximum relative size. In the example of FIG. 20, it is assumed that the first relative size Eyr1 is maximum, the third relative size Eyr3 is smaller than the selection threshold value, and the second relative size Eyr2 is larger than the selection threshold value.

When the target image TI of FIG. 20 is processed, in step S140 of FIG. 19, the size calculation unit 292 (FIG. 14) first calculates three relative sizes Eyr1, Eyr2 and Eyr3 that respectively correspond to three face areas FA1, FA2 and FA3 detected in step S130. Next, the deformation area setting unit 240 determines a selection threshold value and selects a face area having a relative size larger than the selection threshold value. In the example of FIG. 20, the first face area FA1 and the second face area FA2 are selected, and the third face area FA3 is excluded from a target of deformation process. The processes of subsequent steps S500 to S600 shown in FIG. 19 are executed on the selected face areas. As a result, two subjects S1 and S2 each having a relatively large relative size are deformed in accordance with the deformation quantity DQ that is adjusted on the basis of the maximum relative size (in this example, the first relative size Eyr1).

The above described process may be executed in the same manner when the number of subjects detected from the target image TI is two, four or more as well.

As described above, in the sixth example embodiment, only the subject(s) each having a relative size that is close to the maximum relative size is/are deformed in accordance with the deformation quantity DQ that is adjusted on the basis of the maximum relative size. As a result, it is possible to deform a subject that is relatively large and attractive. In addition, it is possible to prevent deformation of a subject that has a sufficiently small relative size and is not attractive as compared with the maximum relative size.

The selection threshold value may be fixed to a predetermined value. However, when the selection threshold value is set, on the basis of a maximum relative size, to a value that is smaller than the maximum relative value, it is possible to select a processing target in conformity to the target image TI.

In the sixth example embodiment, the common deformation quantity DQ is applied to all the deformation areas. Then, the distance parameter used to determine the deformation quantity DQ may employ a parameter such that one value is associated with one target image TI. For example, the subject distance Sd may be used, or the subject distance range Sdr may be used.

G. Seventh Example Embodiment

Figure 21:
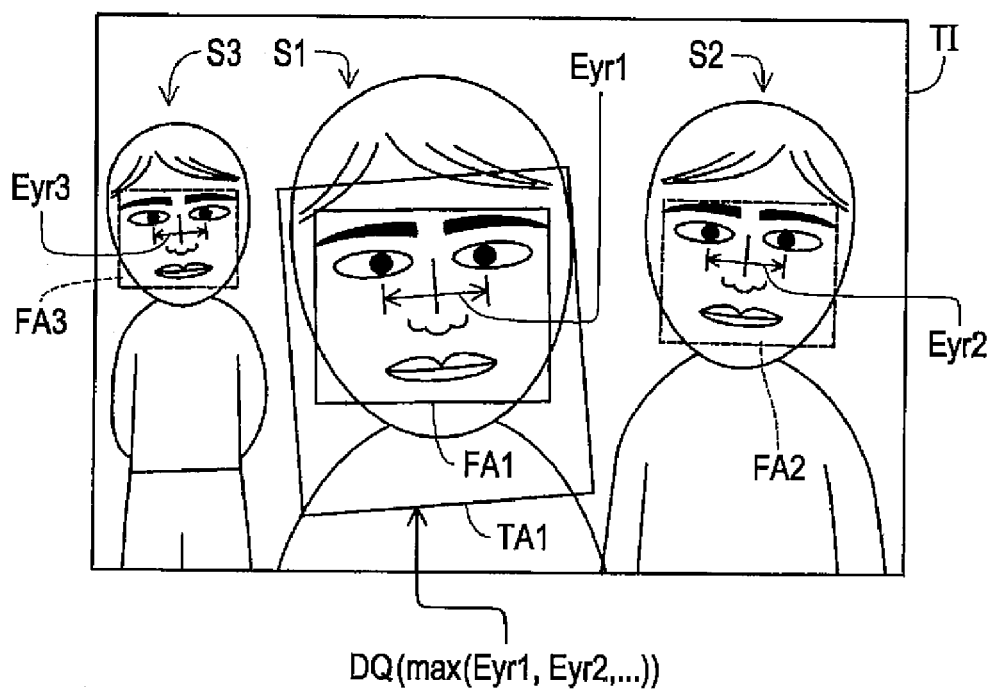
FIG. 21 is a view that schematically illustrates a face shape correction process according to a seventh example embodiment of the invention.

FIG. 21 is a view that schematically illustrates a face shape correction process according to a seventh example embodiment of the invention. In the seventh example embodiment, the face shape correction process, as well as that of the sixth example embodiment of FIG. 20, is executed in accordance with the procedure of FIG. 19. The procedure of the seventh example embodiment differs from that of the sixth example embodiment of FIG. 20 only in that, in step S140, the deformation area setting unit 240 (FIG. 14), when a plurality of face areas (that is, subjects) are detected in step S130, selects the face area (subject) having a maximum relative size. The other steps of FIG. 19 are executed in the same manner as those of the sixth example embodiment.

FIG. 21 shows a case in which the same target image TI as that of FIG. 20 is processed. As is different from the sixth example embodiment shown in FIG. 20, in the seventh example embodiment, only the first face area FA1 having a maximum relative size is selected.

The above described process may be executed in the same manner when the number of subjects detected from the target image TI is two, four or more as well.

As described above, in the seventh example embodiment, only the subject having a maximum relative size is deformed in accordance with the deformation quantity DQ that is adjusted on the basis of the maximum relative size. As a result, it is possible to deform the attractive maximum subject without excessively deforming the entire image.

In the seventh example embodiment, the distance parameter used to determine the deformation quantity DQ may employ a parameter such that one value is associated with one target image TI. For example, the subject distance Sd may be used, or the subject distance range Sdr may be used.

H. Setting of Deformation Area

Figure 22:
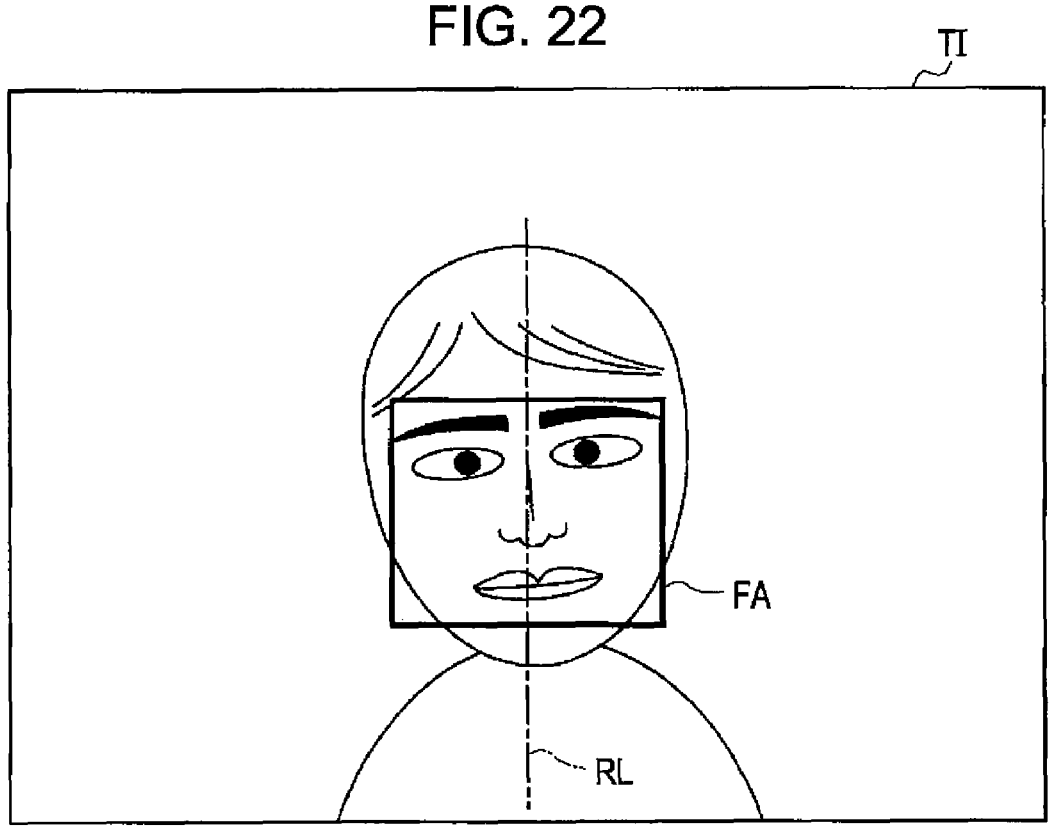
FIG. 22 is a view that illustrates another example of the detection result of a face area.

FIG. 22 illustrates one example of the detection result of the face area FA. In the following description, it is presumed that an image TN1 (FIG. 2) that includes only a face of one person is selected in the user interface by which an image is selected. As shown in FIG. 22, in step S130 of FIG. 4, one face area FA is detected from the target image TI. When a plurality of face areas are detected from the target image TI, the setting process to set a deformation area as described below is performed on each of the detected face areas. The reference line RL of FIG. 22 is a line that defines a height direction (up and down direction) of the face area FA and that indicates the center of the width direction (right to left direction) of the face area FA. That is, the reference line RL is a straight line that passes the center of gravity of the rectangular face area FA and is parallel to the boundary lines that extend along the height direction (up and down direction) of the face area FA.

Figure 23:
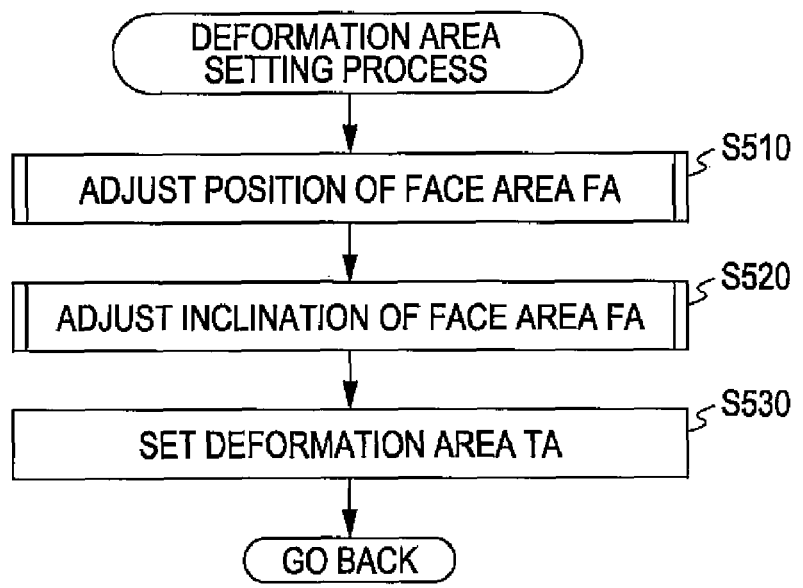
FIG. 23 is a flowchart of a setting process in which a deformation area is set.

FIG. 23 is a flowchart of a setting process to set the deformation area. The process of FIG. 23 is executed in step S500 of FIG. 4. In step S510, the face area adjustment unit 230 (FIG. 1) adjusts the position, in the height direction, of the face area FA that has been detected in step S130 (FIG. 4). Here, the adjustment of position of the face area FA in the height direction means resetting the face area FA in the target image TI by adjusting the position of the face area FA along the reference line RL (see FIG. 22).

Figure 24:
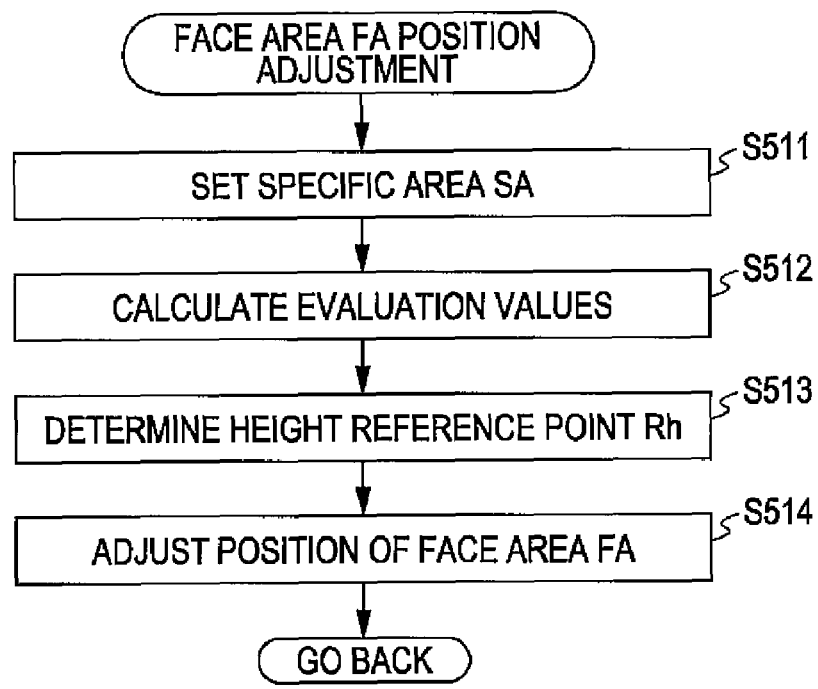
FIG. 24 is a flowchart of a position adjustment process in which the position of the face area in the height direction is adjusted.

FIG. 24 is a flowchart of a position adjustment process in which the position of the face area FA in the height direction is adjusted. In step S511, the face area adjustment unit 230 (FIG. 1) sets a specific area SA. Here, the specific area SA is an area on the target image TI and is an area that includes an image of a predetermined reference subject that is referenced when the adjustment of position of the face area FA in the height direction is executed. The reference subject may be set to "eyes", and, in this case, the specific area SA is set to an area that includes the image of "eyes".

Figure 25:
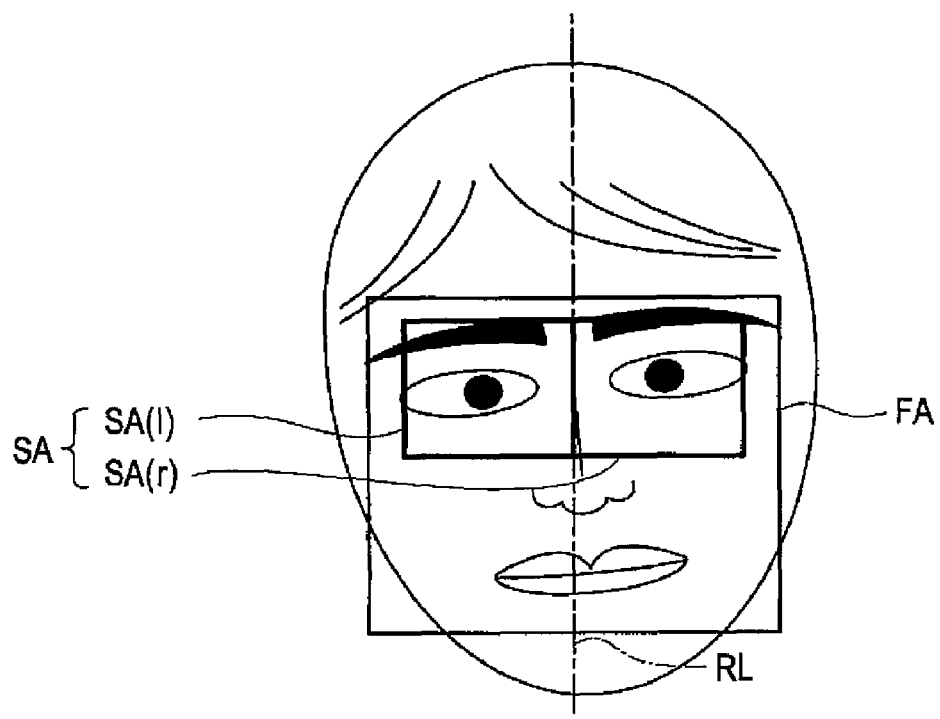
FIG. 25 is a view that illustrates one example of a specific area.

FIG. 25 illustrates one example of the specific area SA. The face area adjustment unit 230 sets the specific area SA on the basis of the relationship with the face area FA. Specifically, the specific area SA is set as an area that is obtained by reducing (or enlarging) the size of the face area FA by a predetermined ratio in a direction perpendicular to the reference line RL and in a direction parallel to the reference line RL and that has a predetermined positional relationship with the position of the face area FA. That is, the predetermined ratio and the predetermined positional relationship are determined in advance so that, when the specific area SA is set on the basis of the relationship with the face area FA that is detected by the face area detection unit 220, the specific area SA includes the image of both eyes. The specific area SA is desirably set as an area as small as possible in so far as the area includes the image of both eyes so as not to include a confusing image (for example, the image of hair) with the image of eyes as much as possible.

In addition, as shown in FIG. 25, the specific area SA is set to an area having a rectangular shape that is symmetrical with respect to the reference line RL. The specific area SA is divided by the reference line RL into a left side area (hereinafter, also referred to as "left divided specific area SA(l)") and a right side area (hereinafter, also referred to as "right divided specific area SA(r)"). The specific area SA is set so that one of the eyes is included in each of the left divided specific area SA(l) and the right divided specific area SA(r).

Figure 26:
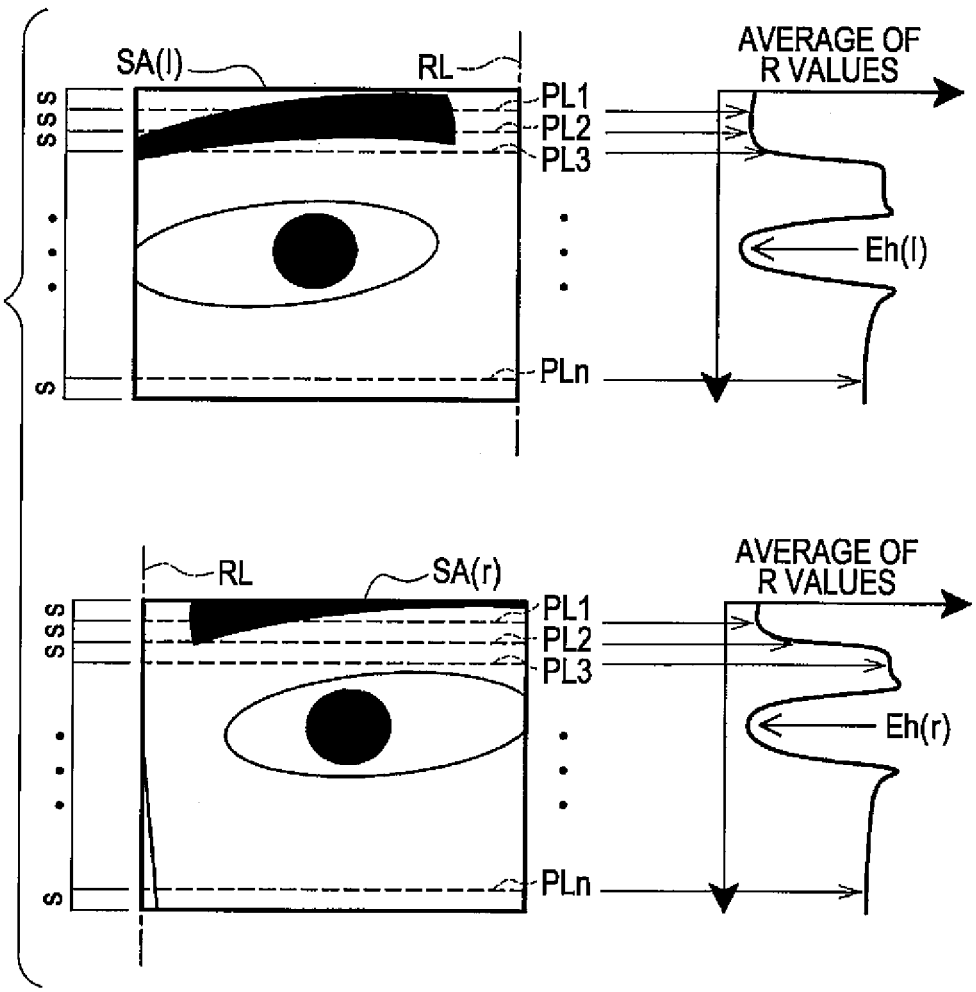
FIG. 26 is a view that illustrates one example of a method of calculating evaluation values.

In step S512 (FIG. 24), the face area adjustment unit 230 (FIG. 1) calculates evaluation values for detecting the position of image of each eye in the specific area SA. FIG. 26 is a view that illustrates one example of a method of calculating evaluation values. R values (R component values) of pixels of the target image TI, which is RGB image data, are desirably used for calculation of the evaluation values. This is because there is a large difference in R values between the image of portion of a skin and the image of portion of an eye and, therefore, it may be presumed that it is possible to improve the detection accuracy of the image of an eye using R values for calculation of evaluation values. In addition, because the data of the target image TI are acquired as RGB data, it is possible to attempt to effectively calculate evaluation values using R values for calculation of evaluation values. As shown in FIG. 26, calculation of evaluation values is separately performed for two divided specific areas (the right divided specific area SA(r) and the left divided specific area SA(l)).

The face area adjustment unit 230, as shown in FIG. 26, sets n straight lines (hereinafter, referred to as "target pixel specifying lines PL1 to PLn") perpendicular to the reference line RL within the divided specific areas (the right divided specific area SA(r) and the left divided specific area SA(l)). The target pixel specifying lines PL1 to PLn are straight lines that equally divide the height (the size along the reference line RL) of each of the divided specific areas into (n+1) parts. That is, the interval between any adjacent target pixel specifying lines PL is an equal interval s.

Figure 27A:
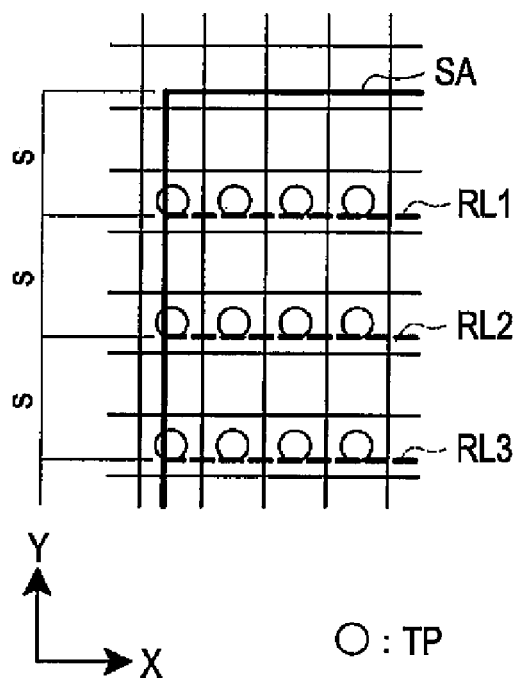
FIG. 27A and FIG. 27B are views, each of which illustrates one example of a method of selecting evaluation target pixels.
Figure 27B:
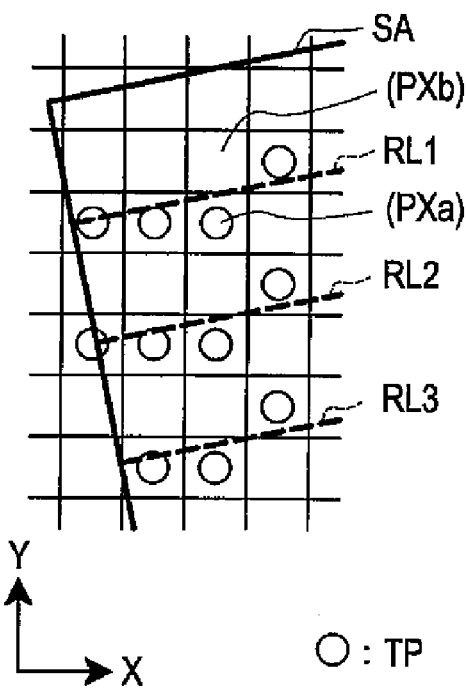

The face area adjustment unit 230 selects pixels (hereinafter, referred to as "evaluation target pixels TP") used for calculation of evaluation values from among pixels that constitute the target image TI for each of the target pixel specifying lines PL1 to PLn. FIG. 27A and FIG. 27B are views, each of which illustrates one example of a method of selecting evaluation target pixels TP. The face area adjustment unit 230 selects the pixels that overlap each of the target pixel specifying lines PL from among the pixels that constitute the target image TI as the evaluation target pixels TP. FIG. 27A shows the case where the target pixel specifying lines PL are parallel to the row direction (X direction in FIG. 27A) of the pixels of the target image TI. In this case, the pixels arranged in each pixel row that overlaps each of the target pixel specifying lines PL (pixels to which symbol "O" is assigned in FIG. 27A) are selected as the evaluation target pixels TP with respect to each of the target pixel specifying lines PL.

On the other hand, depending on a method of detecting the face area FA or a method of setting the specific area SA, the target pixel specifying lines PL may possibly not be parallel to the row direction (X direction) of the pixels of the target image TI, as shown in FIG. 27B. In such a case as well, as a rule, the pixels that overlap each of the target pixel specifying lines PL are selected as the evaluation target pixels TP with respect to each of the target pixel specifying lines PL. However, for example, as in the case of the relationship between a target pixel specifying line PL1 and pixels PXa and PXb, shown in FIG. 27B, when one target pixel specifying line PL overlaps two pixels arranged in the same column (that is, having the same Y coordinate) of the pixel matrix of the target image TI, one of the pixels (for example, the pixel PXb) that overlaps the target pixel specifying line PL shorter in distance than the other is excluded from the evaluation target pixel TP. That is, for each of the target pixel specifying lines PL, only one pixel is selected from one column of the pixel matrix as the evaluation target pixel TP.

When the inclination of the target pixel specifying line PL exceeds 45 degrees with respect to the X direction, the relationship between the column and row of the pixel matrix in the above description is inverted and, therefore, only one pixel is selected from one row of the pixel matrix as the evaluation target pixel TP. In addition, depending on the relationship in size between the target image TI and the specific area SA, one pixel may be selected as the evaluation target pixel TP with respect to a plurality of the target pixel specifying lines PL.

The face area adjustment unit 230 calculates the average of R values of the evaluation target pixels TP for each of the target pixel specifying lines PL. However, with respect to each of the target pixel specifying lines PL, a portion of pixels having a large R value within the plurality of selected evaluation target pixels TP are excluded from calculation of evaluation values. Specifically, for example, when k evaluation target pixels TP are selected with respect to one target pixel specifying line PL, the evaluation target pixels TP are separated into two groups, that is, a first group, which is composed of 0.75 k pixels each having a relatively large R value, and a second group, which is composed of 0.25 k pixels each having a relatively small R values, and then only the pixels that belong to the second group are used to calculate the average of R values as an evaluation value. The reason why a portion of evaluation target pixels TP are excluded from calculation of evaluation values will be described later.

As described above, the face area adjustment unit 230 calculates the evaluation value with respect to each of the target pixel specifying lines PL. Here, because the target pixel specifying lines PL are straight lines that are perpendicular to the reference line RL, the evaluation values may be expressed to be calculated with respect to a plurality of positions (evaluation positions) along the reference line RL. In addition, each of the evaluation values may be expressed as a value that represents the characteristics of distribution of pixel values arranged along a direction perpendicular to the reference line RL with respect to each of the evaluation positions.

In step S513 (FIG. 24), the face area adjustment unit 230 (FIG. 1) detects the position of each eye in the specific area SA and then determines a height reference point Rh on the basis of the detection result. First, with respect to each of the divided specific areas, the face area adjustment unit 230, as shown on the right side in FIG. 26, creates a curve that represents a distribution of evaluation values (average of R values) along the reference line RL and then detects a position, at which the evaluation value takes a minimum value along the direction of reference line RL, as an eye position Eh. The eye position Eh in the left divided specific area SA(l) is denoted as Eh(l) and the eye position Eh in the right divided specific area SA(r) is denoted as Eh(r).

In the case of the yellow human race, it may be presumed that the portion that displays the image of a skin in the divided specific area has a large R value, while, on the other hand, the portion that displays the image of an eye (more specifically, black eye portion of the center of each eye) has a small R value. Therefore, as described above, the position, at which the evaluation value (the average of R values) takes a minimum value along the reference line RL, may be determined as the eye position Eh. However, when the process is intended for other human races (white race or black race), other evaluation values (for example, luminance, lightness, B value, or the like) are used.

As shown in FIG. 26, the divided specific area may possibly include another image (for example, the image of an eyebrow or the image of hair) having a small R value, in addition to the image of an eye. For this reason, the face area adjustment unit 230, when the curve that represents a distribution of evaluation values along the reference line RL takes multiple minimum values, determines the position that is located on the lowest side among the positions that take minimum values as the eye position Eh. Because it is generally presumed that images having small R values, such as an eyebrow or hair, are mostly located on the upper side than the image of an eye, while, on the other hand, images having small R values are rarely located on the lower side than the image of an eye, the above described determination is possible.

In addition, even when the above curve is located on the lower side (mainly, a position corresponding to the image of a skin) than the position of the image of an eye, because there is a possibility that the curve may take a minimum value despite its large evaluation value, minimum values that exceed a predetermined threshold value may be ignored. Alternatively, the position of the target pixel specifying line PL, which corresponds to a minimum value among evaluation values calculated with respect to each of the target pixel specifying lines PL, may be simply determined as the eye position Eh.

An eye (a black eye portion of the center of each eye), at which it may be presumed that a difference in color from its surrounding is large within the face, is used as a reference subject for adjusting the position of the face area FA. However, because the average value of R values as the evaluation value is calculated for the plurality of evaluation target pixels TP on each of the target pixel specifying lines PL, there is a possibility that the accuracy of detection of a black eye portion may be deteriorated, for example, due to the influence of an image of a white eye portion that surrounds the black eye. In this example embodiment, as described above, the accuracy of detection of a reference subject is further improved in such a manner that a portion of evaluation target pixels TP (for example, pixels having a relatively large R value, belonging to the above described first group), which may be regarded to have a large color difference in comparison with the reference subject, are excluded from calculation of evaluation values.

Figure 28:
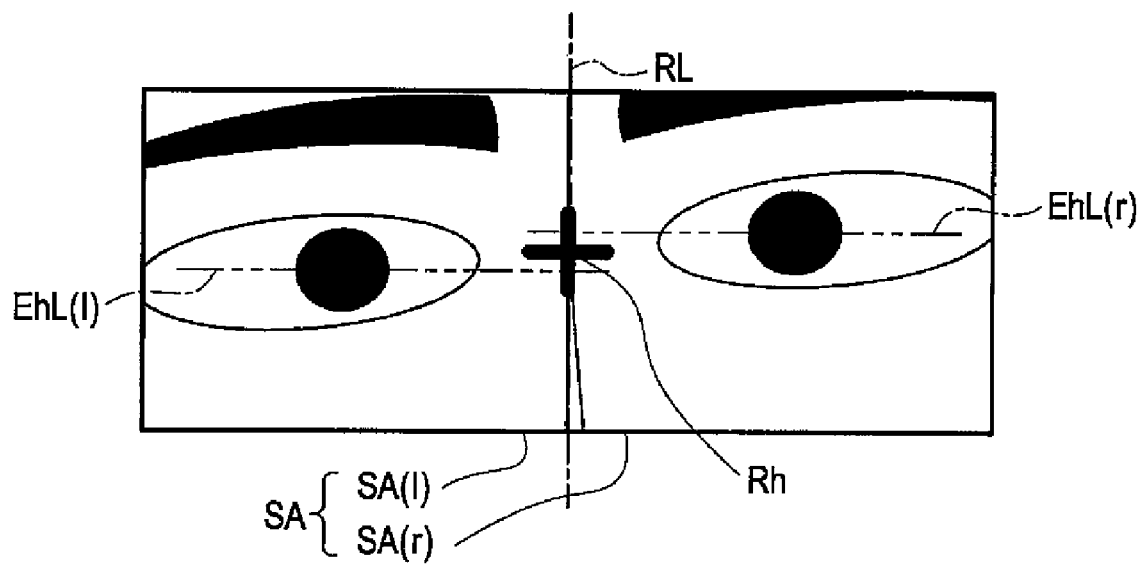
FIG. 28 is a view that illustrates one example of a method of determining a height reference point.

Next, the face area adjustment unit 230 determines a height reference point Rh on the basis of the detected eye position Eh. FIG. 28 is a view that illustrates one example of a method of determining a height reference point Rh. The height reference point Rh is a point used as a reference when the position of the face area FA in the height direction is adjusted. As shown in FIG. 28, the point that is located at the middle of the positions Eh(l) and Eh(r) of the two right and left eyes on the reference line RL is set as the height reference point Rh. That is, the midpoint of the intersection point of a straight line EhL(l), which indicates the left eye position Eh(l), and the reference line RL and the intersection point of a straight line EhL(r), which indicates the right eye position Eh(r), and the reference line RL is set as the height reference point Rh.

Figure 29:
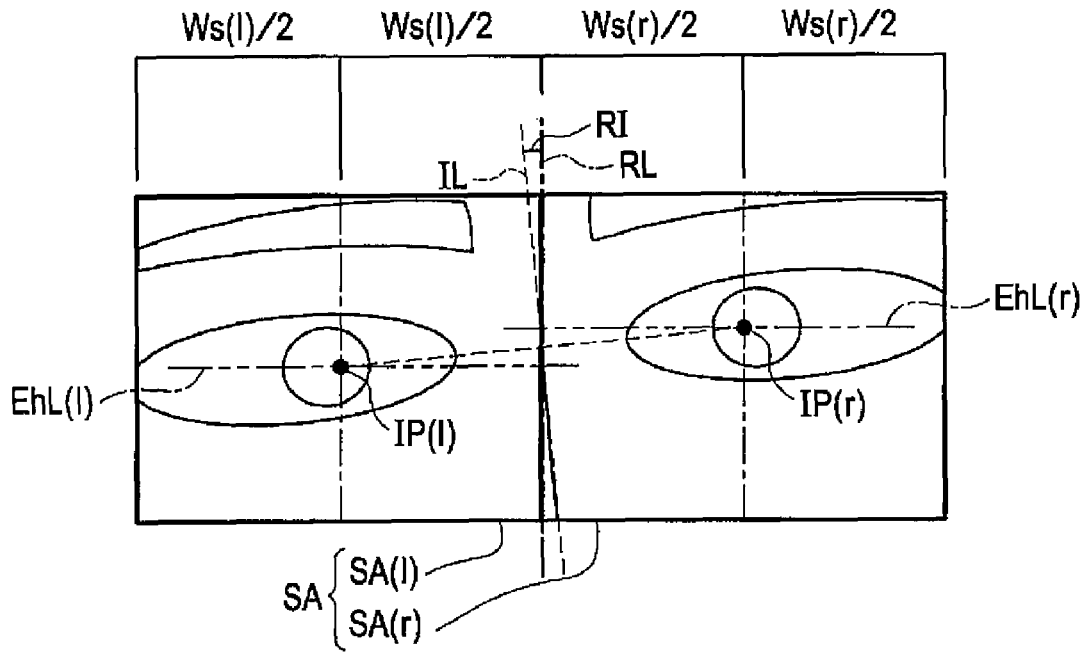
FIG. 29 is a view that illustrates one example of a method of calculating an approximate inclination angle.

The face area adjustment unit 230 calculates an approximate inclination angle (hereinafter, referred to as "approximate inclination angle RI") of a face image on the basis of the detected eye position Eh. The approximate inclination angle RI of a face image is an angle that is obtained by estimating how many angles at which the image of a face in the target image TI is approximately inclined with respect to the reference line RL of the face area FA. FIG. 29 is a view that illustrates one example of a method of calculating an approximate inclination angle. As shown in FIG. 29, the face area adjustment unit 230 first determines an intersection point IP(l) of a straight line, which divides the width Ws(l) of the left divided specific area SA(l) in half, and the straight line EhL(l) and an intersection point IP(r) of a straight line, which divides the width Ws(r) of the right divided specific area SA(r) in half, and the straight line EhL(r). Then, an angle that is made by a straight line IL perpendicular to the straight line that connects the intersection point IP(l) and the intersection point IP(r) with the reference line RL is calculated as the approximate inclination angle RI.

Figure 30:
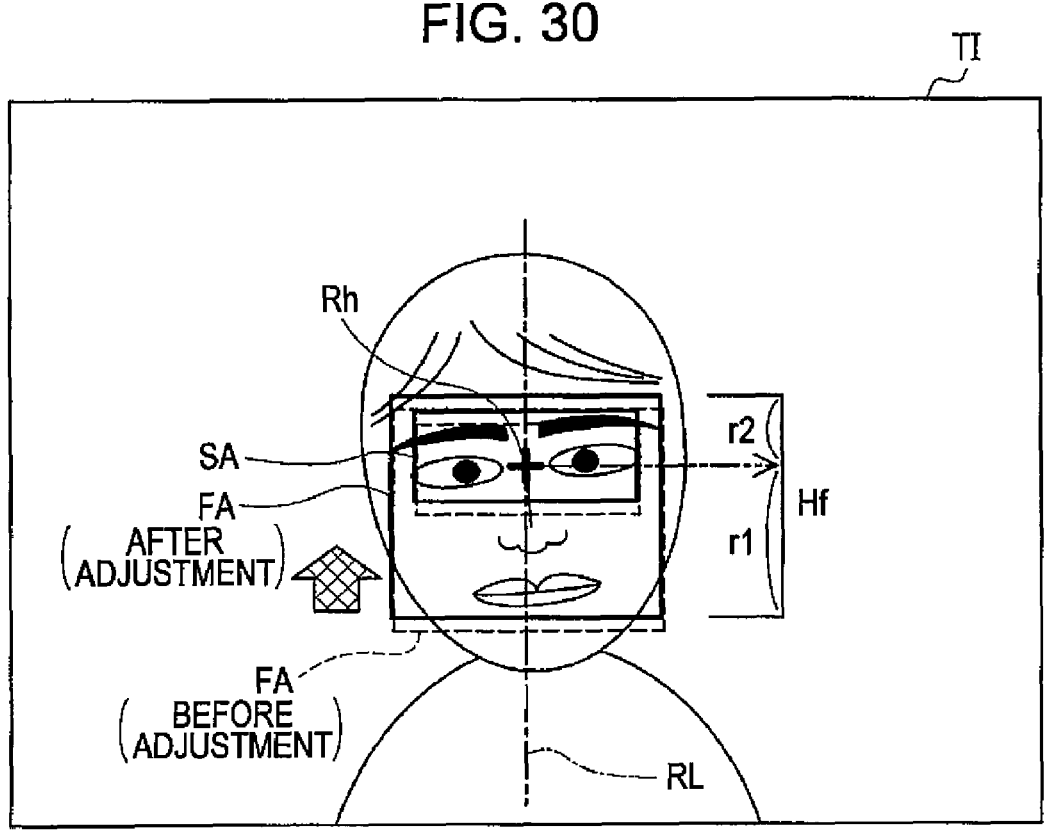
FIG. 30 is a view that illustrates one example of a method of adjusting the position of the face area in a height direction.

In step S514 (FIG. 24), the face area adjustment unit 230 (FIG. 1) adjusts the position of the face area FA in the height direction. FIG. 30 is a view that illustrates one example of a method of adjusting the position of the face area FA in the height direction. The adjustment of the position of the face area FA in the height direction is performed in such a manner that the face area FA is reset so that the height reference point Rh is located at a predetermined position in the face area FA of which the position has been adjusted. Specifically, as shown in FIG. 30, the position of the face area FA is adjusted upward or downward along the reference line RL so that the height reference point Rh is located at a position at which the height Hf of the face area FA is divided by a predetermined ratio of r1 to r2. In the example shown in FIG. 30, by moving the face area FA, of which the position has not yet been adjusted as shown by the dotted line, upward, the face area FA, of which the position is adjusted as shown by the solid line, is reset.

After the position of the face area FA has been adjusted, in step S520 (FIG. 23), the face area adjustment unit 230 (FIG. 1) adjusts (angle adjustment) the inclination of the face area FA. Here, the adjustment of inclination of the face area FA means resetting the face area FA so that the inclination of the face area FA in the target image TI is adjusted to conform to the inclination of the image of the face. The predetermined reference subject that is referenced when the adjustment of inclination of the face area FA is executed is, for example, set to "both eyes". In the adjustment of inclination of the face area FA, a plurality of evaluation directions that represent the choices of adjustment angles of inclination are set, and the evaluation specific area ESA corresponding to each of the evaluation directions is set as an area that includes the images of both eyes. Then, in regard to each of the evaluation directions, evaluation values are calculated on the basis of pixel values of the image of the evaluation specific area ESA, and then the inclination of the face area FA is adjusted using the adjustment angle of inclination determined on the basis of the evaluation values.

Figure 31:
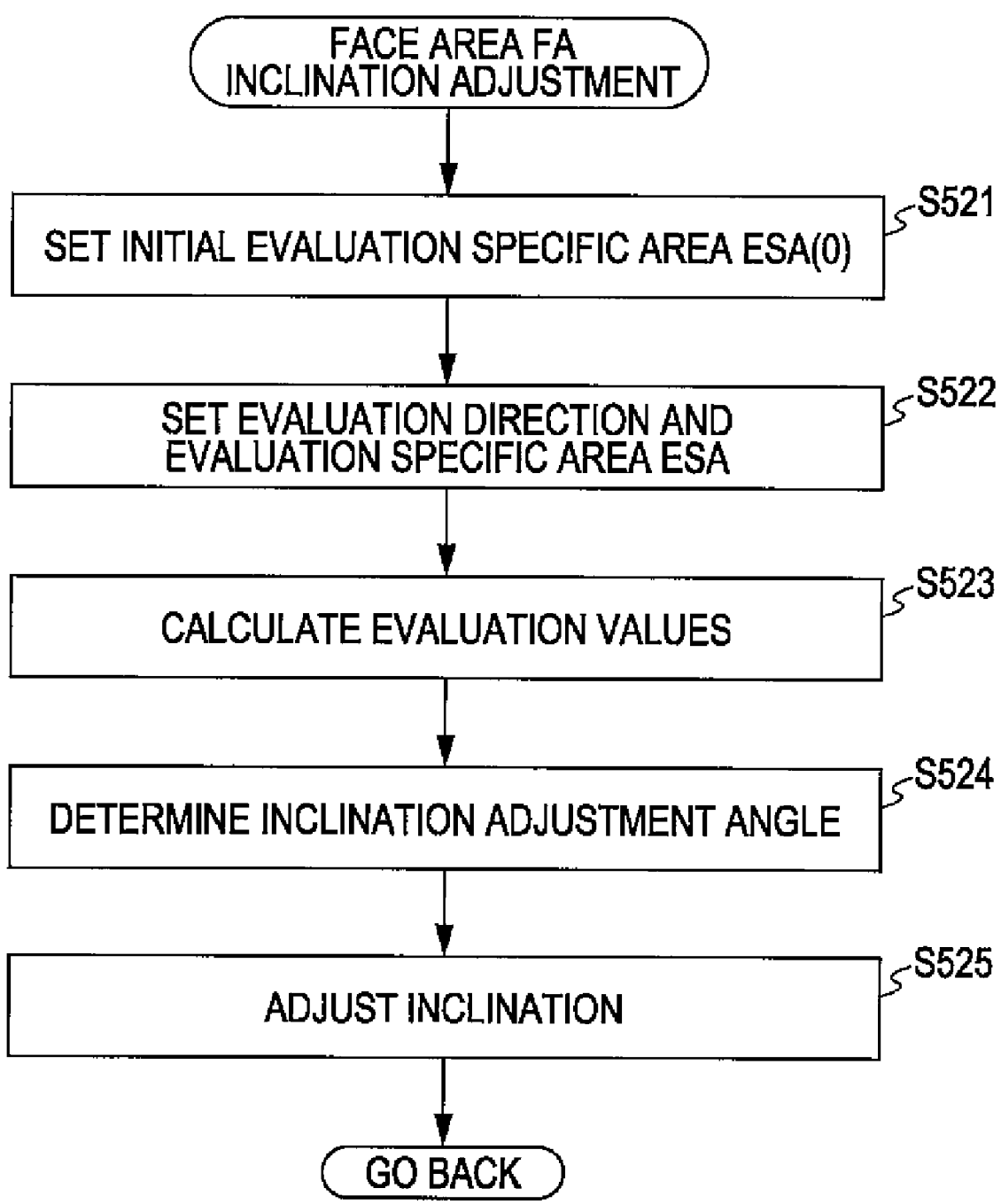
FIG. 31 is a flowchart of an inclination adjustment process in which the inclination of the face area is adjusted.
Figure 32:
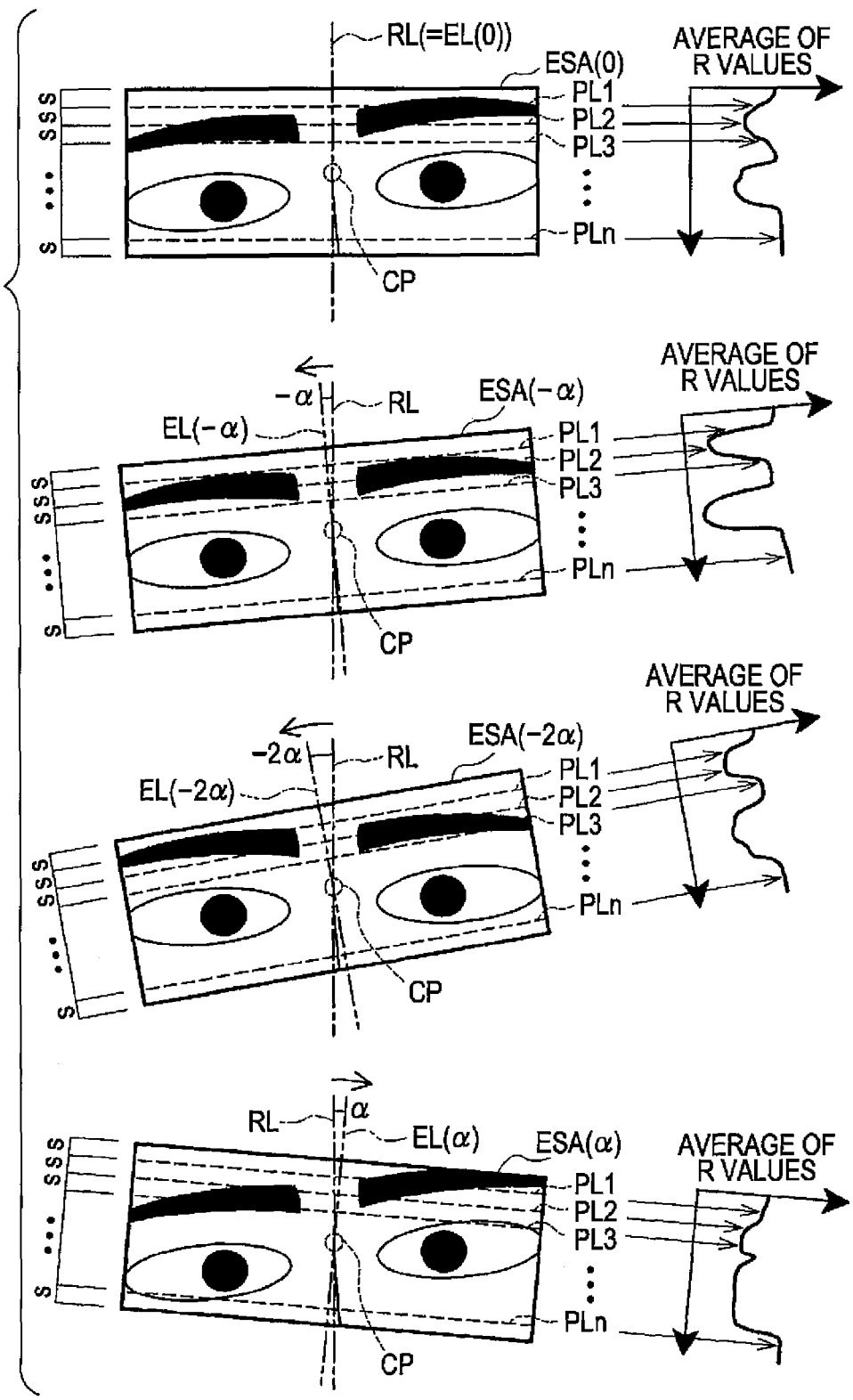
FIG. 32 is a view that illustrates one example of a method of calculating evaluation values used for adjusting the inclination of the face area.

FIG. 31 is a flowchart of an inclination adjustment process to adjust the inclination of the face area FA. FIG. 32 illustrates one example of a method of calculating evaluation values used for adjusting the inclination of the face area FA. In step S521 (FIG. 31), the face area adjustment unit 230 (FIG. 1) sets an initial evaluation specific area ESA(0). The initial evaluation specific area ESA(0) is an evaluation specific area ESA that is associated with a direction (hereinafter, also referred to as "initial evaluation direction") parallel to the reference line RL (see FIG. 30) that is obtained after the position of the face area FA has been adjusted. The specific area SA (see FIG. 30) corresponding to the face area FA of which the position has been adjusted is set as the initial evaluation specific area ESA(0) as it is. The evaluation specific area ESA used for adjusting the inclination of the face area FA is not divided into two right and left areas, different from the specific area SA that is used when the position of the face area FA is adjusted. The set initial evaluation specific area ESA(0) is shown in the uppermost drawing of FIG. 32.

In step S522 (FIG. 31), the face area adjustment unit 230 (FIG. 1) sets a plurality of evaluation directions and an evaluation specific area ESA corresponding to each of the evaluation directions. The plurality of evaluation directions are set as directions that represent the choices of adjustment angles of inclination. Specifically, a plurality of evaluation direction lines EL, of which angles that are made with the reference line RL fall within a predetermined range, are set, and directions parallel to the evaluation direction lines EL are set as evaluation directions. As shown in FIG. 32, straight lines that are determined in such a manner that the reference line RL is rotated about the center point (center of gravity) CP of the initial evaluation specific area ESA(0) on a predetermined angle α basis in a counterclockwise direction or in a clockwise direction are set as the plurality of evaluation direction lines EL. The evaluation direction line EL of which an angle that is made with the reference line RL is φ degrees is denoted as EL(φ).

The above described predetermined range in regard to an angle that is made by each evaluation direction line EL with the reference line RL is set to a range of ±20 degrees. In this description, a rotation angle is indicated by a positive value when the reference line RL is rotated in a clockwise direction, and a rotation angle is indicated by a negative value when the reference line RL is rotated in a counterclockwise direction. The face area adjustment unit 230 rotates the reference line RL in a counterclockwise direction or in a clockwise direction while increasing a rotation angle like α degrees, 2α degrees, ... within a range that does not exceed 20 degrees to thereby set the plurality of evaluation direction lines EL. FIG. 32 shows the evaluation direction lines EL (EL(−α), EL(−2α), EL(α)) that are respectively determined by rotating the reference line RL at −α degrees, −2α degrees, and α degrees. The reference line RL may also be expressed as an evaluation direction line EL(0).

The evaluation specific area ESA corresponding to the evaluation direction line EL that represents each of the evaluation directions is an area that is obtained by rotating the initial evaluation specific area ESA(0) about the center point CP at the same angle as the rotation angle when the evaluation direction line EL is set. The evaluation specific area ESA corresponding to the evaluation direction line EL(φ) is denoted as an evaluation specific area ESA(φ). FIG. 32 shows the evaluation specific areas ESA (ESA(-α), ESA(-2α), and ESA(α)) that respectively correspond to the evaluation direction lines EL(-α), EL(-2α), and EL(α). The initial evaluation specific area ESA(0) is also treated as one of the evaluation specific areas ESA.

In step S523 (FIG. 31) the face area adjustment unit 230 (FIG. 1) calculates evaluation values on the basis of pixel values of an image of the evaluation specific area ESA with respect to each of the plurality of set evaluation directions. The average value of R values is used as an evaluation value for adjusting the inclination of the face area FA as in the case of the above described evaluation value for adjusting the position of the face area FA. The face area adjustment unit 230 calculates evaluation values for the plurality of evaluation positions located along the evaluation direction.

The method of calculating the evaluation value is the same as the above described method of calculating the evaluation value for adjusting the position of the face area FA. That is, the face area adjustment unit 230, as shown in FIG. 32, sets the target pixel specifying lines PL1 to PLn perpendicular to the evaluation direction line EL within each of the evaluation specific areas ESA, selects the evaluation target pixels TP with respect to each of the target pixel specifying lines PL1 to PLn, and then calculates the average of R values of the selected evaluation target pixels TP as the evaluation value.

A method of setting the target pixel specifying lines PL within the evaluation specific area ESA or a method of selecting the evaluation target pixels TP are the same as the method of adjusting the position of the face area FA shown in FIG. 26, FIG. 27A and FIG. 27B except whether an area is divided into right and left areas. As in the case of the adjustment of position of the face area FA, a portion of the selected evaluation target pixels TP (for example, 0.75 k pixels having a relatively large R values among the evaluation target pixels TP) may be excluded from calculation of evaluation values. On the right side of FIG. 32, in regard to each of the evaluation directions, a distribution of the calculated evaluation values along the evaluation direction line EL is shown.

The target pixel specifying line PL is a straight line perpendicular to the evaluation direction line EL, so that the evaluation value may be calculated with respect to a plurality of positions (evaluation positions) along the evaluation direction line EL. In addition, the evaluation value may be expressed as a value that represents the characteristics of a distribution of pixel values along the direction perpendicular to the evaluation direction line EL with respect to each of the evaluation positions.

In step S524 (FIG. 31), the face area adjustment unit 230 (FIG. 1) determines an adjustment angle that is used to adjust the inclination of the face area FA. With respect to each of the evaluation directions, the face area adjustment unit 230 calculates a distribution of the evaluation values, calculated in step S523, along the evaluation direction line EL and selects an evaluation direction that has a maximum variance. Then, an angle made by the evaluation direction line EL, which corresponds to the selected evaluation direction, with the reference line RL is determined as an adjustment angle used for adjusting the inclination.

Figure 33:
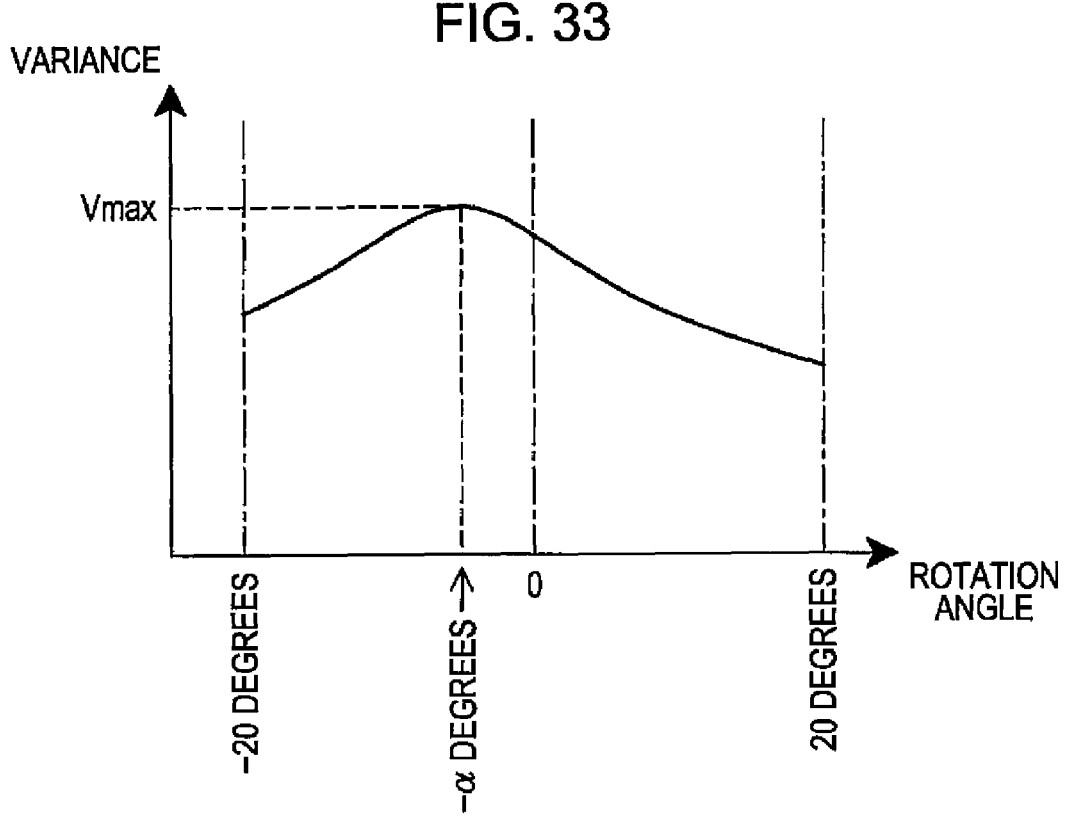
FIG. 33 is a view that illustrates one example of the calculation result of a variance of evaluation values with respect to each evaluation direction.

FIG. 33 illustrates one example of the calculation result of variance of evaluation values with respect to each evaluation direction. In the example of FIG. 33, the variance takes a maximum value Vmax in the evaluation direction of which the rotation angle is -α degrees. Thus, -α degrees, that is, a rotation angle of α degrees in a counterclockwise direction is determined as an adjustment angle used for adjusting the inclination of the face area FA.

The reason why an angle corresponding to the evaluation direction in which the value of a variance of evaluation values becomes maximum is determined as an adjustment angle used for adjusting the inclination will be described. As shown by the second drawing of FIG. 32 from the upper side, in the evaluation specific area ESA(-α) in which the rotation angle is -α degrees, the images of the center portions (black eye portions) of right and left eyes are arranged so that they are aligned in a direction substantially parallel to the target pixel specifying line PL (that is, a direction perpendicular to the evaluation direction line EL). In addition, at this time, similarly, the images of right and left eyebrows are also arranged so that they are aligned in a direction substantially perpendicular to the evaluation direction line EL. Accordingly, the evaluation direction corresponding to the evaluation direction line EL at this time may be regarded as a direction that substantially represents the inclination of a face image. At this time, the positional relationship between the image of an eye or an eyebrow generally having small R values and the image of a skin portion generally having large R values will be a positional relationship in which both of the images have less overlapping portions along the direction of the target pixel specifying line PL. Therefore, the evaluation value at a position of the image of an eye or an eyebrow is relatively small, and the evaluation value at a position of the image of a skin portion is relatively large. Thus, the distribution of evaluation values along the evaluation direction line EL will be a distribution having a relatively large dispersion (large amplitude), as shown in FIG. 32, and the value of a variance becomes large.

On the other hand, as shown in the uppermost, third and fourth drawings of FIG. 32, in the evaluation specific areas ESA(0), ESA(-2α), and ESA(α) in which the rotation angles are respectively 0 degree, -2α degrees, and α degrees, the images of the center portions of right and left eyes or the images of right and left eyebrows are not aligned in a direction perpendicular to the evaluation direction line EL and are deviated from each other. Thus, the evaluation direction corresponding to the evaluation direction line EL at this time does not represent the inclination of the face image. At this time, the positional relationship between the image of an eye or an eyebrow generally having small R values and the image of a skin portion generally having large R values will be a positional relationship in which both of the images have much overlapping portions along the direction of the target pixel specifying line PL. Thus, the distribution of evaluation values along the evaluation direction line EL will be a distribution having a relatively small dispersion (small amplitude), as shown in FIG. 32, and the value of a variance becomes small.

As described above, when the evaluation direction is close to the direction of inclination of the face image, the value of a variance of the evaluation values along the evaluation direction line EL becomes large, and, when the evaluation direction is remote from the direction of inclination of the face image, the value of a variance of the evaluation values along the evaluation direction line EL becomes small. Thus, when an angle corresponding to the evaluation direction in which the value of a variance of the evaluation values becomes maximum is determined as an adjustment angle used for adjusting the inclination, it is possible to realize such the adjustment of inclination of the face area FA that the inclination of the face area FA conforms to the inclination of the face image.

When the calculation result of the variance of the evaluation values is a critical value within the range of angles, that is, the calculation result becomes a maximum value at an angle of −20 degrees or 20 degrees, it may be presumed that the inclination of a face is probably not properly evaluated. Thus, the adjustment of inclination of the face area FA is not executed in this case.

In addition, the determined adjustment angle is compared with the approximate inclination angle RI that has been calculated when the position of the face area FA is adjusted as described above. When a difference between the adjustment angle and the approximate inclination angle RI is larger than a predetermined threshold value, it may be presumed that an error has occurred when evaluation or determination has been made in adjusting the position of the face area FA or in adjusting the inclination thereof. Thus, the adjustment of position of the face area FA and the adjustment of inclination thereof are not executed in this case.

Figure 34:
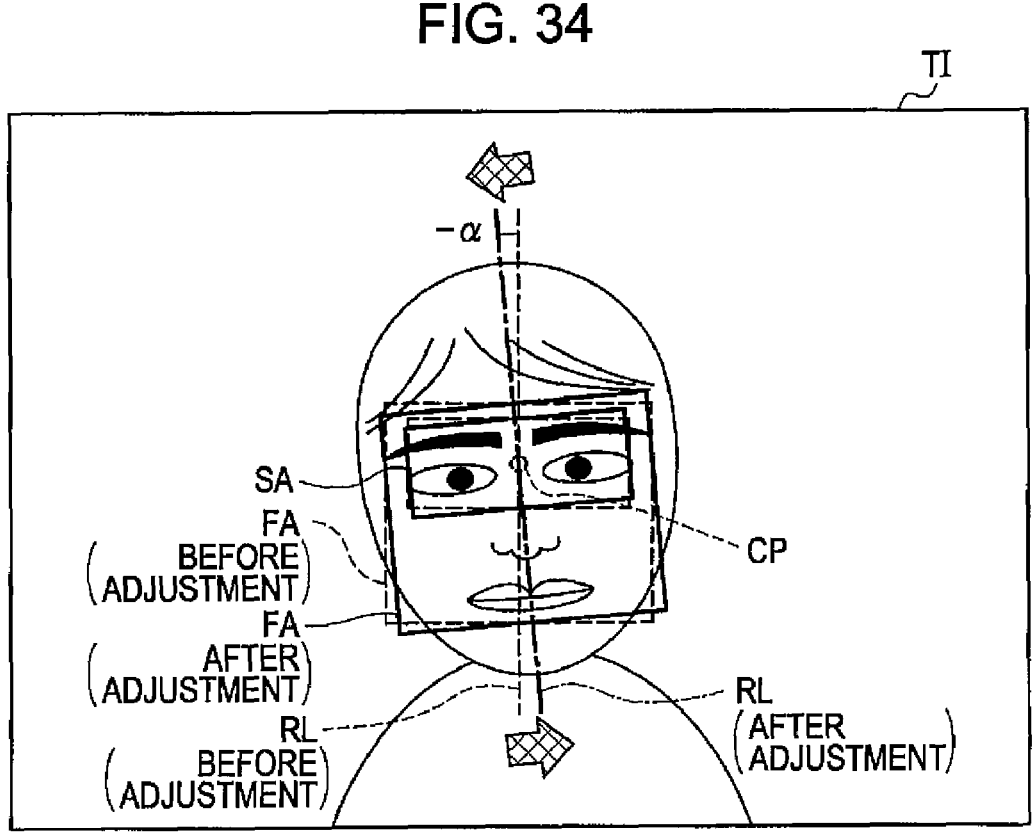
FIG. 34 is a view that illustrates one example of a method of adjusting the inclination of the face area.

In step S525 (FIG. 31), the face area adjustment unit 230 (FIG. 1) adjusts the inclination of the face area FA. FIG. 34 is a view that illustrates one example of a method of adjusting the inclination of the face area FA. The adjustment of inclination of the face area FA is performed in such a manner that the face area FA is rotated about the center point CP of the initial evaluation specific area ESA(0) by the adjustment angle that is determined in step S524. In the example of FIG. 34, by rotating the face area FA of which the angle has not yet been adjusted, indicated by the broken line, in a counterclockwise direction by α degrees, the face area FA of which the angle has been adjusted, indicated by the solid line, is set.

Figure 35:
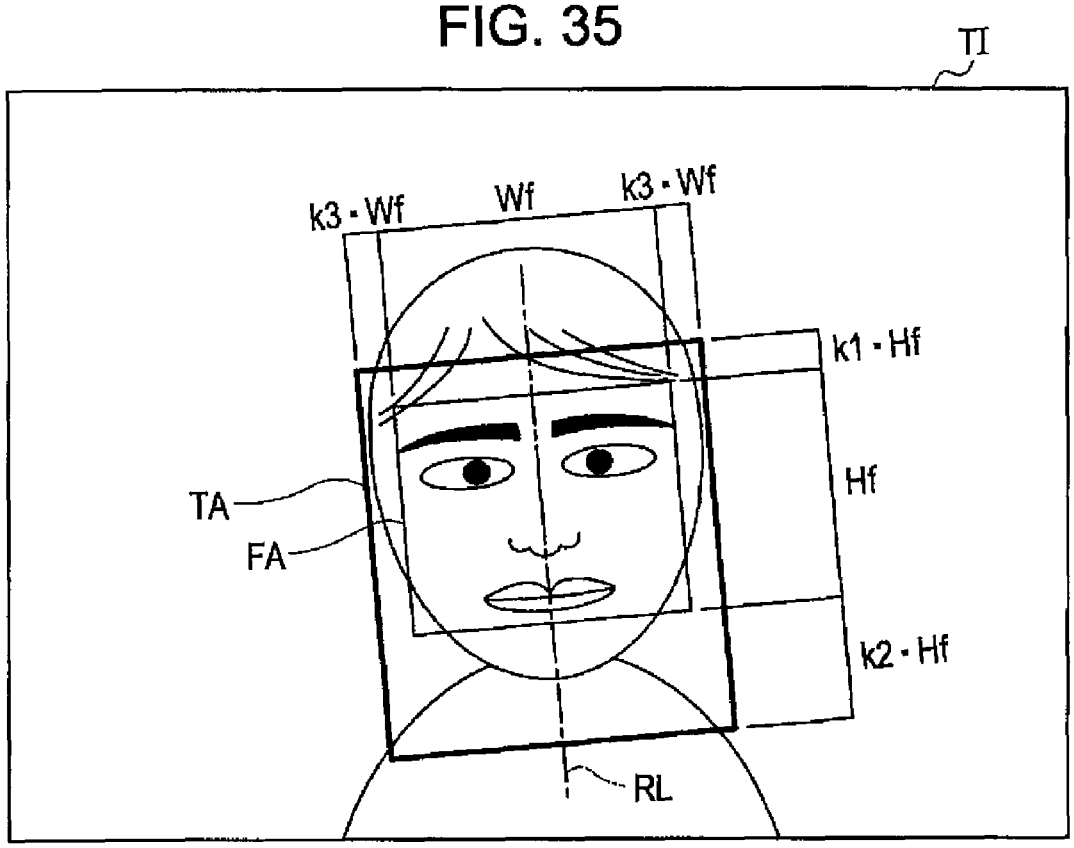
FIG. 35 is a view that illustrates one example of a method of setting a deformation area.

In step 530 (FIG. 23) after the adjustment of inclination of the face area FA has been completed, the deformation area setting unit 240 (FIG. 1) sets a deformation area TA. The deformation area TA is an area on the target image TI and is an area on which image deformation processing is performed for face shape correction. FIG. 35 is a view that illustrates one example of a method of setting the deformation area TA. As shown in FIG. 35, the deformation area TA is set as an area such that the face area FA is extended (or contracted) in a direction parallel to the reference line RL (height direction) and in a direction perpendicular to the reference line RL (width direction). Specifically, where the size of the face area FA in the height direction is Hf, the size of the face area FA in the width direction is Wf, an area that is obtained by extending the face area FA upward by an amount of k1·Hf and downward by an amount of k2·Hf and by extending the face area FA to the right side and to left side, respectively, by an amount of k3·Wf is set as the deformation area TA. Note that k1, k2, and k3 are predetermined coefficients.

When the deformation area TA is set in this manner, the reference line RL, which is a straight line parallel to the contour line of the face area FA in the height direction, will be a straight line that is also parallel to the contour line of the deformation area TA in the height direction. In addition, the reference line RL becomes a straight line that divides the width of the deformation area TA in half.

As shown in FIG. 35, the deformation area TA is set as an area that includes the image substantially from the jaw to the forehead with respect to the height direction and includes the images of right and left cheeks with respect to the width direction. That is, the coefficients k1, k2, and k3 are set in advance on the basis of the relationship with the size of the face area FA so that the deformation area TA becomes an area that substantially includes the image of the above described range.

I. Face Deformation Process

Figure 36:
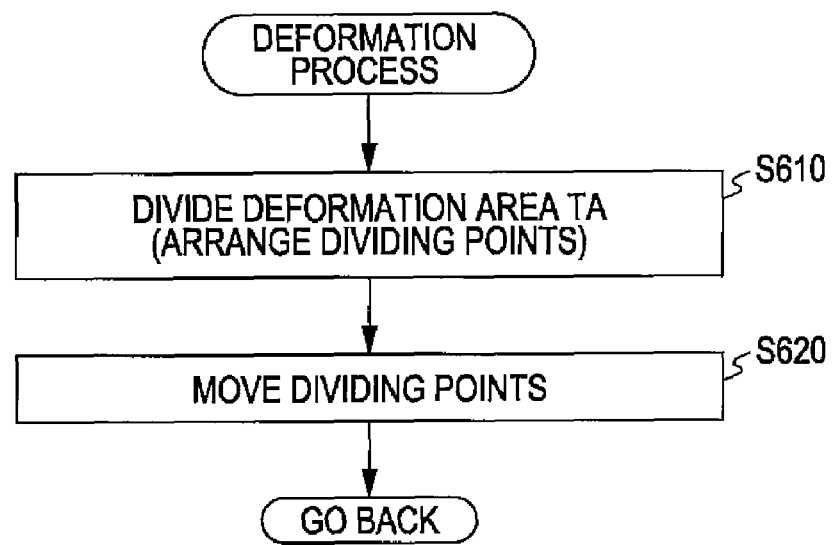
FIG. 36 is a flowchart of the deformation process.
Figures 37, 38:
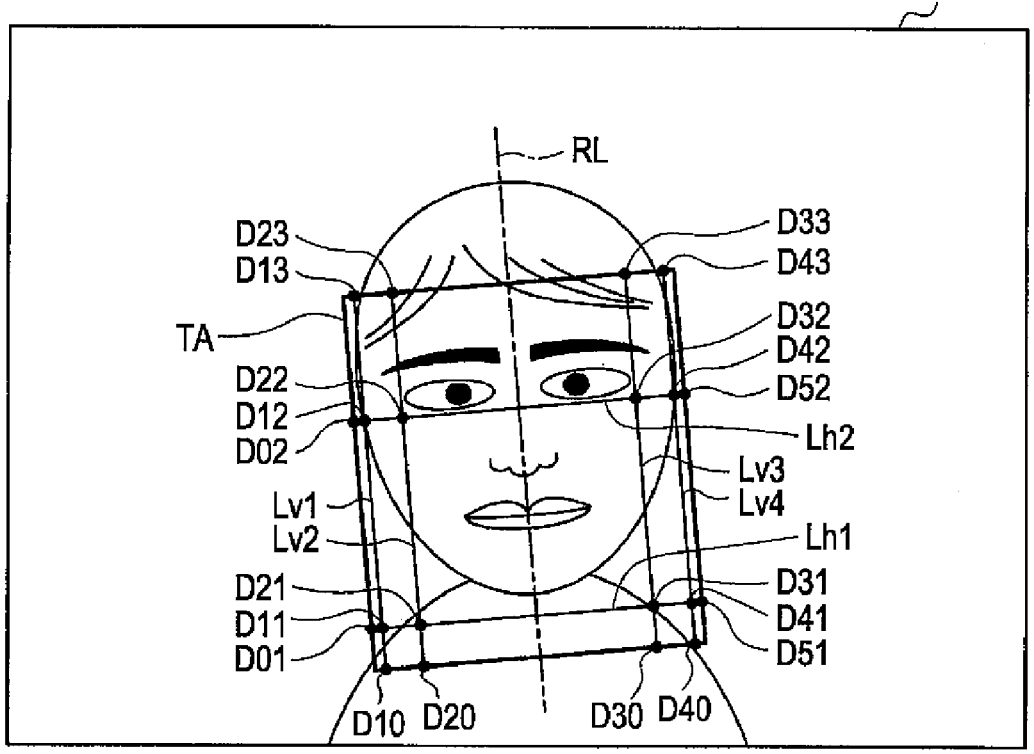
FIG. 37 is a view that illustrates one example of a method of dividing the deformation area into small areas.
FIG. 38 is a view that illustrates one example of the content of a dividing point moving table.

FIG. 36 is a flowchart of the deformation process. The process of FIG. 36 is executed in step S600 of FIG. 4. In step S610, the deformation area dividing unit 250 (FIG. 1) divides the deformation area TA into a plurality of small areas. FIG. 37 illustrates one example of a method of dividing the deformation area TA into small areas. The deformation area dividing unit 250 arranges a plurality of dividing points D in the deformation area TA and then divides the deformation area TA into a plurality of small areas using the straight lines that connect the dividing points D.

The mode of arrangement of the dividing points D (the number and positions of the dividing points D) is defined in the dividing point arrangement pattern table 410 (FIG. 1) in association with a deformation type that is set in step S120 (FIG. 4). The deformation area dividing unit 250 references the dividing point arrangement pattern table 410 and then arranges dividing points D in the mode that is associated with the deformation type set in step S120. As described above, because the deformation "type A" (see FIG. 5) for sharpening a face is set as the deformation type, the dividing points D are arranged in the mode that is associated with this deformation type.

As shown in FIG. 37, the dividing points D are arranged at intersections of horizontal dividing lines Lh and vertical dividing lines Lv and at intersections of the horizontal dividing lines Lh or vertical dividing lines Lv and the outer frame line of the deformation area TA. Here, the horizontal dividing lines Lh and the vertical dividing lines Lv are reference lines for arranging the dividing points D in the deformation area TA. As shown in FIG. 37, in arranging the dividing points D that are associated with the deformation type for sharpening a face, two horizontal dividing lines Lh perpendicular to the reference line RL and four vertical dividing lines Lv parallel to the reference line RL are set. The two horizontal lines Lh are denoted as Lh1, Lh2 in the order from the lower side of the deformation area TA. In addition, the four vertical dividing lines Lv are denoted as Lv1, Lv2, Lv3, and Lv4 in the order from the left side of the deformation area TA.

In the deformation area TA, the horizontal dividing line Lh1 is arranged on the lower side relative to the image of the jaw, and the horizontal dividing line Lh2 is arranged immediately below the images of the eyes. In addition, the vertical dividing lines Lv1 and Lv4 each are arranged outside the image of the line of the cheek, and the vertical dividing lines Lv2 and Lv3 each are arranged outside the image of the outer corner of the eye. The arrangement of the horizontal dividing lines Lh and vertical dividing lines Lv is executed in accordance with the correspondence relationship with the size of the deformation area TA that is set in advance so that the positional relationship between the horizontal dividing lines Lh or vertical dividing lines Lv and the image eventually becomes the above described positional relationship.

In accordance with the above described arrangement of the horizontal dividing lines Lh and vertical dividing lines Lv, the dividing points D are arranged at the intersections of the horizontal dividing lines Lh and the vertical dividing lines Lv and at the intersections of the horizontal dividing lines Lh or vertical dividing lines Lv and the outer frame line of the deformation area TA. As shown in FIG. 37, the dividing points D that are located on the horizontal dividing line Lhi (i=1 or 2) are denoted as D0i, D1i, D2i, D3i, D4i, and D5i in the order from the left side. For example, the dividing points D that are located on the horizontal dividing line Lh1 are denoted as D01, D11, D21, D31, D41, and D51. Similarly, the dividing points that are located on the vertical dividing line Lvj (j=any one of 1, 2, 3, and 4) are denoted as Dj0, Dj1, Dj2, and Dj3 in the order from the lower side. For example, the dividing points D that are located on the vertical dividing line Lv1 are denoted as D10, D11, D12, and D13.

As shown in FIG. 37, the dividing points D in the present example embodiment are arranged symmetrically with respect to the reference line RL.

The deformation area dividing unit 250 divides the deformation area TA into a plurality of small areas using the straight lines that connect the arranged dividing points D (that is, the horizontal dividing lines Lh and the vertical dividing lines Lv). As shown in FIG. 37, the deformation area TA is divided into 15 rectangular small areas.

Because the arrangement of the dividing points D is determined on the basis of the number and positions of the horizontal dividing lines Lh and vertical dividing lines Lv, the dividing point arrangement pattern table 410 may be regarded that it defines the number and positions of the horizontal dividing lines Lh and vertical dividing lines Lv.

In step S620 (FIG. 36), the divided area deformation unit 260 (FIG. 1) moves the positions of the dividing points D, which have been arranged in the deformation area TA in step S610, to thereby deform the small areas.

The moving mode (moving direction and moving distance) of the position of each dividing point D for deformation process is determined in advance in association with the combinations of the deformation type and the degree of deformation, which are set in step S120 (FIG. 4), by the dividing point moving table 420 (FIG. 1). The divided area deformation unit 260 references the dividing point moving table 420 and moves the positions of the dividing points D using the moving direction and moving distance that are in association with the combination of the deformation type and the degree of deformation, which are set in step S120.

As described above, when the deformation "type A" (see FIG. 5) for sharpening a face is set as the deformation type, and the degree of extent "Middle" is set as the deformation degree, the positions of the dividing points D are moved using the moving direction and the moving distance, which are associated with the combination of these deformation type and deformation degree.

In addition, when "Automatic" is selected as the deformation degree, the moving direction and the moving distance are determined on the basis of the deformation quantity DQ that is adjusted by the deformation amount adjustment unit 290.

Figure 39:
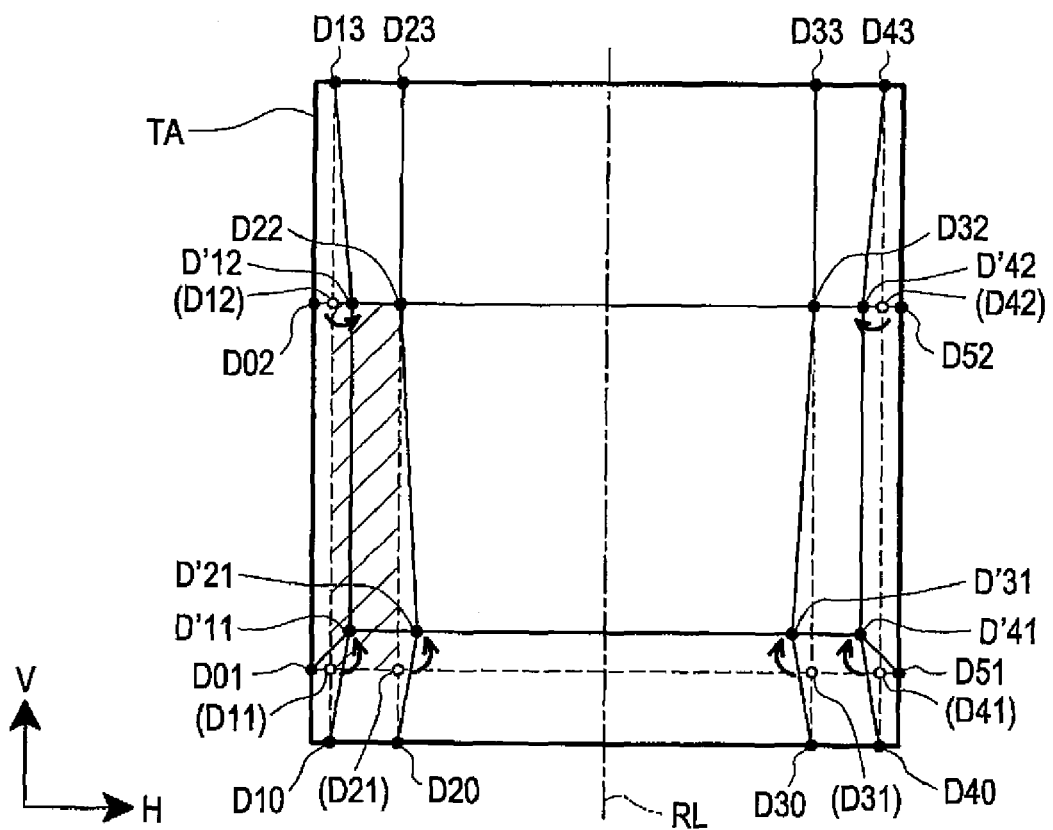
FIG. 39 is a view that illustrates one example of movement of positions of dividing points in accordance with the dividing point moving table.

FIG. 38 illustrates one example of the content of the dividing point moving table 420. In addition, FIG. 39 illustrates one example of movement of positions of dividing points D in accordance with the dividing point moving table 420. FIG. 38 shows, among the moving modes of the positions of the dividing points D defined by the dividing point moving table 420, a moving mode that is associated with the combination of the deformation type for sharpening a face and the deformation degree "Automatic". As shown in FIG. 38, the dividing point moving table 420 indicates, with respect to each of the dividing points D, the amount of movement along a direction (H direction) perpendicular to the reference line RL and along a direction (V direction) parallel to the reference line RL. The unit of the amount of movement shown in the dividing point moving table 420 is a pixel pitch PP of the target image TI. The deformation quantity DQp in the table is determined by the deformation amount adjustment unit 290 (FIG. 1, FIG. 14). In step S590 of FIG. 4 or FIG. 19, the deformation amount adjustment unit 290 calculates the deformation quantity DQp by converting the adjusted deformation quantity DQ to a pixel pitch. In addition, in regard to the H direction, the amount of movement toward the right side is indicated by a positive value and the amount of movement toward the left side is indicated by a negative value, while, in regard to the V direction, the amount of upward movement is indicated by a positive value and the amount of downward movement is indicated by a negative value. For example, the dividing points D11 are moved toward the right side by a distance of DQp times the pixel pitch PP along the H direction and are moved upward by a distance of 2*DQp times the pixel pitch PP along the V direction. In addition, for example, the amount of movement of the dividing point D22 is zero in both the H direction and V direction, so that the dividing point D22 will not be moved. When any one of "Strong (S)", "Middle (M)" and "Weak (W)" is selected as the deformation degree, the deformation quantity DQp employs a value that is determined in advance in association with each of the deformation degrees in place of a value that is adjusted by the deformation amount adjustment unit 290.

In order to avoid making the boundary between the images inside and outside the deformation area TA be unnatural, the positions of the dividing points D (for example, the dividing point D10, and the like, shown in FIG. 39) located on the outer frame line of the deformation area TA are not moved. Thus, the dividing point moving table 420 shown in FIG. 38 does not define a moving mode with respect to the dividing points D that are located on the outer frame line of the deformation area TA.

FIG. 39 shows the dividing points D that have not yet been moved using the outline circle and shows the dividing points D that have been moved or the dividing points D of which the positions will not be moved using the solid circle. The dividing points D that have been moved are denoted by dividing points D'. For example, the position of the dividing point D11 is moved in an upper right direction in FIG. 39 and then it will be a dividing point D'11.

The moving mode is determined so that all the pairs of the dividing points D that are symmetrically located with respect to the reference line RL (for example, the pair of the dividing point D11 and the dividing point D41) maintain the symmetrical positional relationship with respect to the reference line RL after the dividing points D have been moved.

The divided area deformation unit 260 executes image deformation process on each of the small areas that constitute the deformation area TA so that the images of the small areas in a state where the positions of the dividing points D have not yet been moved become images of small areas that are newly defined through the position movement of the dividing points D. For example, in FIG. 39, the image of a small area (small area indicated by hatching) having vertexes of dividing points D11, D21, D22, and D12 is deformed into the image of a small area having vertexes of dividing points D'11, D'21, D22, and D'12.

Figure 40:
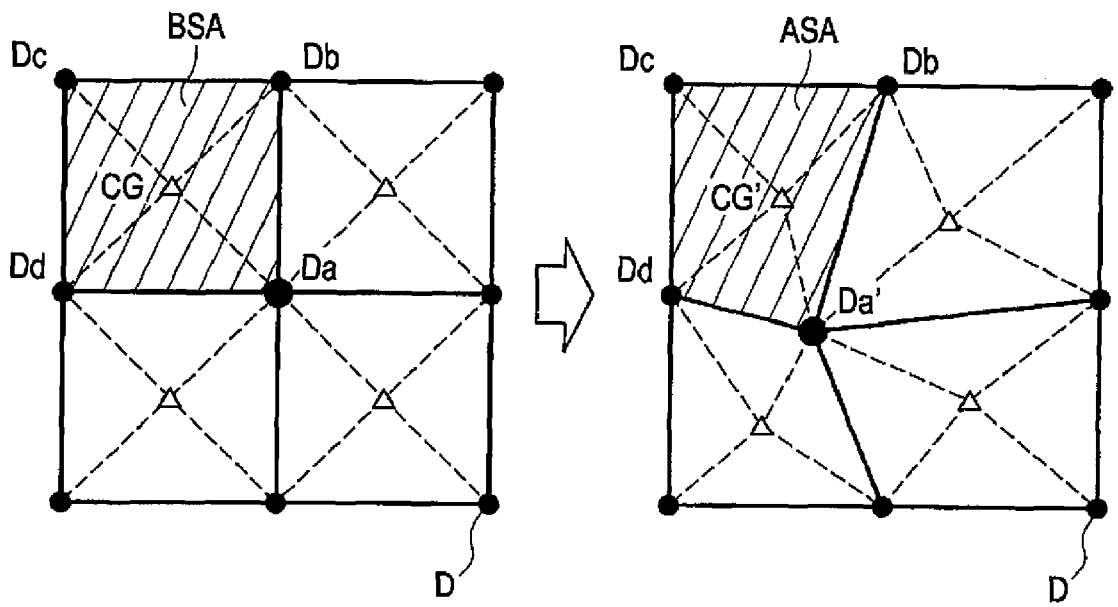
FIG. 40 is a view that illustrates the concept of a method of performing deformation on an image using a divided area deformation unit.

FIG. 40 illustrates the concept of a deformation processing method of an image using the divided area deformation unit 260. In FIG. 40, the dividing points D are shown using solid circles. FIG. 40 shows, with respect to four small areas, the state of dividing points D, of which the positions have not yet been moved, on the left side and the state of dividing points D, of which the positions have been moved, on the right side, respectively, for easy description. In the example of FIG. 40, a center dividing point Da is moved to the position of a dividing point Da', and the positions of the other dividing points will not be moved. In this manner, for example, the image of a rectangular small area (hereinafter, also referred to as "pre-deformation focusing small area BSA") having the vertexes of dividing points Da, Db, Dc, and Dd of which the positions of the dividing points D have not yet been moved is deformed into the image of a rectangular small area (hereinafter, also referred to as "post-deformation focusing small area ASA") having the vertexes of the dividing points Da', Db, Dc, and Dd.

The rectangular small area is divided into four triangle areas using the center of gravity CG of the rectangular small area, and the image deformation process is executed on a triangle area basis. In the example of FIG. 40, the pre-deformation focusing small area BSA is divided into four triangle areas, each having one of the vertexes at the center of gravity CG of the pre-deformation focusing small area BSA. Similarly, the post-deformation focusing small area ASA is divided into four triangle areas, each having one of the vertexes at the center of gravity CG' of the post-deformation focusing small area ASA. The image deformation process is then executed for each of the triangle areas corresponding to the respective states of the dividing point Da before and after movement. For example, the image of a triangle area that has the vertexes of dividing points Da, Dd and the center of gravity CG within the pre-deformation focusing small area BSA is deformed into the image of a triangle area that has the vertexes of dividing points Da', Dd and the center of gravity CG' within the post-deformation focusing small area ASA.

Figure 41:
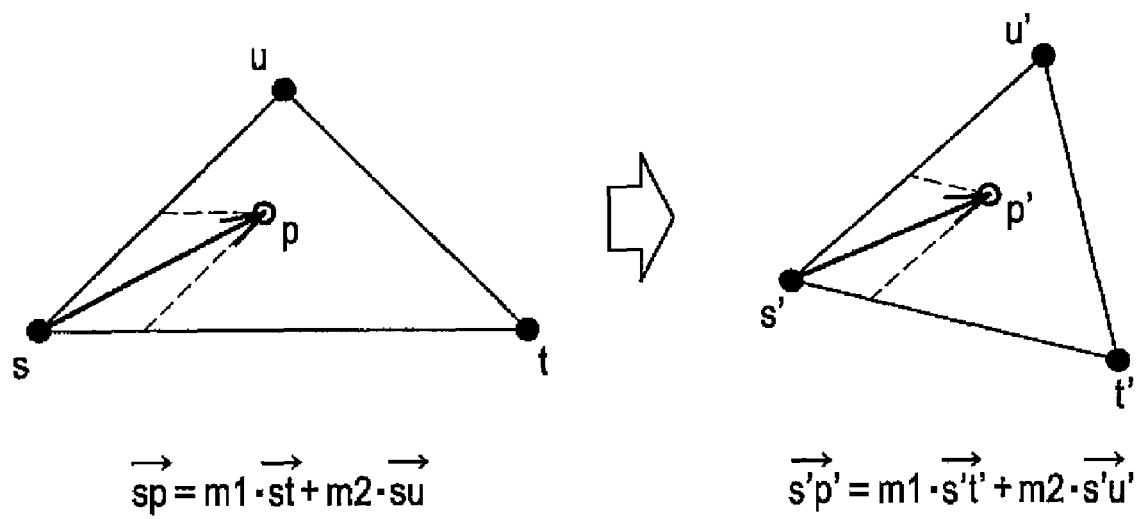
FIG. 41 is a view that illustrates the concept of a method of performing deformation process on an image in a triangle area.

FIG. 41 illustrates the concept of a method of performing deformation process on an image in a triangle area. In FIG. 41, the image of a triangle area stu that has the vertexes of points s, t, and u is deformed into the image of a triangle area s't'u' that has the vertexes of points s', t', and u'. The deformation of an image is performed in such a manner that which one of the positions in the image of the triangle area stu that has not yet been deformed corresponds to each of the positions of pixels in the image of the triangle area s't'u' that has been deformed is calculated, and pixel values in the image that has not yet been deformed at the positions calculated are set to pixel values of the image that has been deformed.

For example, in FIG. 41, the position of a focusing pixel p' in the image of the triangle area s't'u' that has been deformed corresponds to a position p in the image of the triangle area stu that has not yet been deformed. The calculation of the position p is performed in the following manner. First, coefficients m1 and m2 that are used to represent the position of the focusing pixel p' using the sum of a vector s't' and a vector s'u' shown in the following equation (1) are calculated.

$$\vec{s'p'} = m1 \cdot \vec{s't'} + m2 \cdot \vec{s'u'} \qquad \text{Equation 1}$$

Next, using the calculated coefficients m1 and m2, the sum of a vector st and a vector su in the triangle area stu that has not yet been deformed is calculated through the following equation (2) and, as a result, the position p is obtained.

$$\vec{sp} = m1 \cdot \vec{st} + m2 \cdot \vec{su} \qquad \text{Equation 2}$$

When the position p in the triangle area stu that has not yet been deformed coincides with a pixel center position of the image that has not yet been deformed, the pixel value of that pixel is set as a pixel value of the image that has been deformed. On the other hand, when the position p in the triangle area stu that has not yet been deformed becomes a position deviated from the pixel center position of the image that has not yet been deformed, a pixel value at the position p is calculated by means of interpolation computing, such as bicubic, that uses the pixel values of pixels around the position p, and then the calculated pixel value is set to a pixel value of the image that has been deformed.

By calculating the pixel value as described above in regard to each pixel of the image in the triangle area s't'u' that has been deformed, it is possible to execute image deformation process by which the image of the triangle area stu is deformed into the image of the triangle area s't'u'. The divided area deformation unit 260, in terms of each of the small areas that constitute the deformation area TA shown in FIG. 39, defines the triangle area as described above and executes deformation process, thus executing image deformation process on the deformation area TA.

Figure 42:
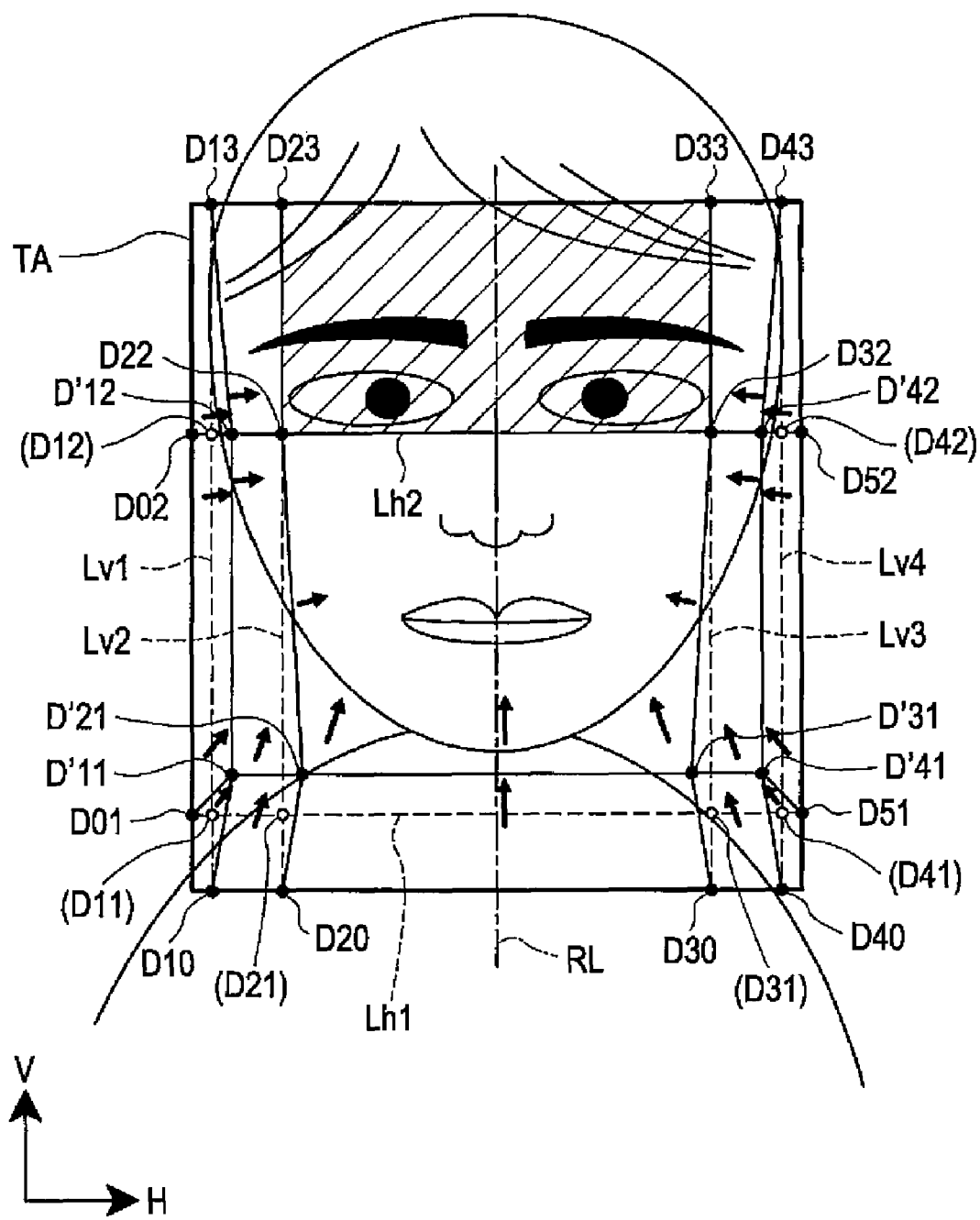
FIG. 42 is a view that illustrates one example of a mode of face shape correction.

Here, the mode of face shape correction, when the deformation "type A" (see FIG. 5) for sharpening a face is set as the deformation type and the "Automatic" is set as the deformation degree, will be described in more detail. FIG. 42 illustrates one example of the mode of face shape correction in the above case. In FIG. 42, the image of deformation mode of each of the small areas that constitute the deformation area TA is shown by the arrow.

In the face shape correction of FIG. 42, with respect to a direction (V direction) parallel to the reference line RL, the positions of the dividing points D (D11, D21, D31, D41) that are arranged on the horizontal dividing line Lh1 are moved upward, while, on the other hand, the positions of the dividing points D (D12,D22,D32,D42) that are arranged on the horizontal dividing line Lh2 are not moved (see FIG. 38). Thus, the image located between the horizontal dividing line Lh1 and the horizontal dividing line Lh2 is reduced with respect to the V direction. As described above, because the horizontal dividing line Lh1 is arranged on the lower side relative to the image of the jaw, and the horizontal dividing line Lh2 is arranged immediately below the images of the eyes, in the face shape correction, within the image of the face, the image of an area extending from the jaw to a portion below the eyes is reduced in the V direction. As a result, the line of the jaw in the image is moved upward.

On the other hand, with respect to a direction (H direction) perpendicular to the reference line RL, the positions of the dividing points D (D11, D12) that are arranged on the vertical dividing line Lv1 are moved to the right direction, and the positions of the dividing points D (D41, D42) that are arranged on the vertical dividing line Lv4 are moved to the left direction (see FIG. 38). Furthermore, among two dividing points D that are arranged on the vertical dividing line Lv2, the position of the dividing point D (D21) that is arranged on the horizontal dividing line Lh1 is moved to the right direction, and, among two dividing points D that are arranged on the vertical dividing line Lv3, the position of the dividing point D (D31) that is arranged on the horizontal dividing line Lh1 is moved to the left direction (see FIG. 38). Thus, the image that is located on the left side with respect to the vertical dividing line Lv1 is enlarged to the right side in the H direction, and the image on the right side with respect to the vertical dividing line Lv4 is enlarged to the left side in the H direction. In addition, the image that is located between the vertical dividing line Lv1 and the vertical dividing line Lv2 is reduced or moved to the right side in the H direction, and the image that is located between the vertical dividing line Lv3 and the vertical dividing line Lv4 is reduced or moved to the left side in the H direction. Furthermore, the image that is located between the vertical dividing line Lv2 and the vertical dividing line Lv3 is reduced in the H direction using the position of the horizontal dividing line Lh1 as a center.

As described above, the vertical dividing lines Lv and Lv4 each are located outside the image of the line of the cheek, the vertical dividing lines Lv2 and Lv3 each are arranged outside the image of the outer corner of the eye. Therefore, in the face shape correction of the example of FIG. 42, within the image of the face, the images of portions outside both the outer corners of the eyes are entirely reduced in the H direction. Particularly, the reduction ratio is high around the jaw. As a result, the shape of the face in the image is entirely narrowed in the width direction.

When the deformation modes in the H direction and in the V direction, described above, are combined, the shape of the face in the target image TI is sharpened through the face shape correction shown in the example of FIG. 42. Sharpening of the shape of a face may be expressed as so-called becoming a "small face".

The small (hatched) areas having the vertexes at the dividing points D22, D32, D33, and D23 shown in FIG. 42 include the images of both eyes when the above described method of arranging the horizontal dividing line Lh2 and the vertical dividing lines Lv2 and Lv3 is used. As shown in FIG. 38, because the dividing points D22 and D32 are not moved in the H direction or in the V direction, the small area that includes the images of both eyes is not deformed. In the example of FIG. 42 as described above, the small area that includes the images of both eyes is not deformed, so that the image on which face shape correction has been executed becomes more natural and desirable.

J. Other Deformation Process

Figure 43A:
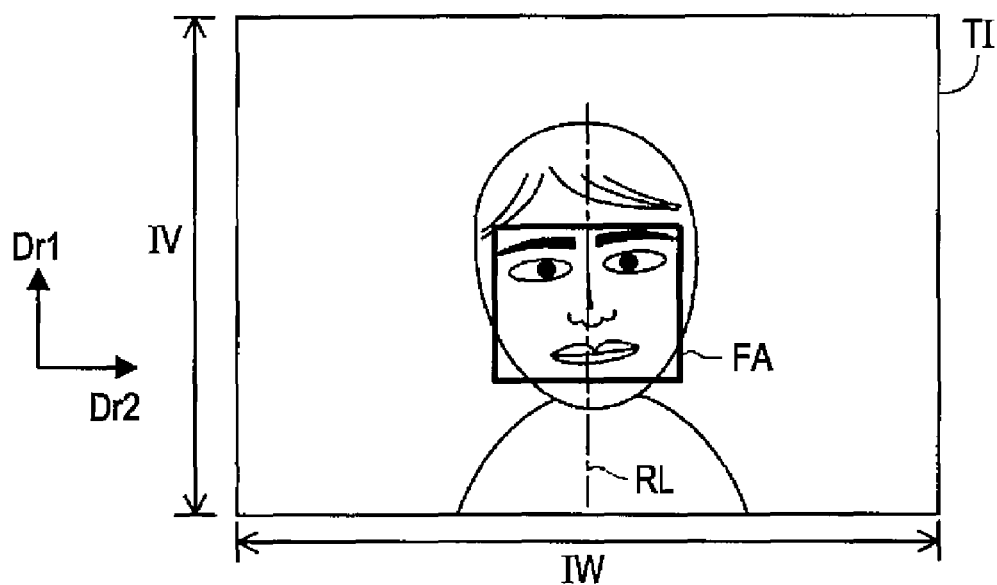
FIG. 43A and FIG. 43B are schematic views, each of which shows another example embodiment of a deformation process.
Figure 43B:
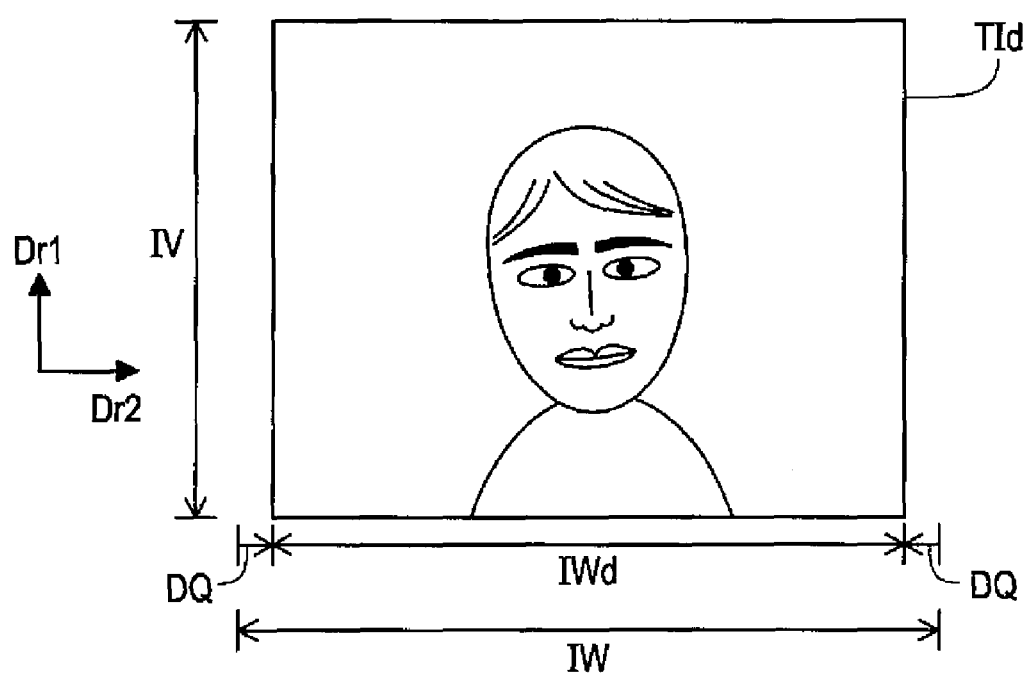

FIG. 43A and FIG. 43B are schematic views, each of which shows another example embodiment of a deformation process. As is different from the deformation process of FIG. 8A and FIG. 8B, in the example of FIG. 43A and FIG. 43B, the entire aspect ratio of the target image TI is changed in place of portion of the deformation area on the target image TI being deformed.

FIG. 43A shows the target image TI before deformation, and FIG. 43B shows an image TId after deformation. In addition, two directions Dr1 and Dr2 that are perpendicular to each other are shown in the drawing. The first direction Dr1 indicates a direction parallel to the short side of the rectangular image TI or TId, and the second direction Dr2 indicates a direction parallel to the long side of the rectangular image TI or TId. In FIG. 43A and FIG. 43B, the width direction of the face substantially coincides with the second direction Dr2.

In FIG. 43A and FIG. 43B, deformation along the first direction Dr1 is not executed, and deformation (compression) along the second direction Dr2 is executed. Through this deformation, the entire image is compressed along the second direction Dr2. That is, the width of the subject on the target image TI is also narrowed. As a result, it is possible to approximate the impression of the subject obtained by observing an image to the impression obtained by observing the actual subject.

In this deformation, the size (width IWd) of the deformed image TId in the second direction Dr2 is smaller by twice the deformation quantity DQ than the size (width IW) of the image before deformation. That is, the number of pixels of the deformed image TId in the second direction Dr2 is smaller than the number of pixels of that image before deformation. Here, the method of determining pixel values (gray scale values of the pixels) of the deformed image TId may employ various methods. For example, by interpolating pixel values of the target image TI, the pixel values of the deformed image TId may be determined.

The deformation quantity DQ may employ a selected deformation quantity that is described in each of the above described embodiments. For example, the deformation quantity DQ that is determined on the basis of the subject distance Sd may be employed, or the deformation quantity DQ that is determined on the basis of the subject distance range Sdr may be employed, or the deformation quantity DQ that is determined on the basis of the relative size Eyr may be employed. In addition, when a plurality of subjects are detected, the deformation quantity DQ that is determined on the basis of the maximum relative size Eyr may be employed.

It is desirable to select a direction to be compressed from among two directions Dr1 and Dr2 on the basis of the detection result of the orientation of the subject. For example, the face area detection unit 220 (FIG. 1), as shown in FIG. 22 and FIG. 43A, is able to detect the reference line RL that indicates the height direction (up and down direction) of the face area FA. Then, it is desirable to select, among the two directions Dr1 and Dr2, a direction in which an angle made with this reference line RL is larger (in each of the examples of FIG. 43A and FIG. 43B, second direction Dr2). In this manner, it is possible to reduce the width (the size in the horizontal direction) of the subject.

When the deformation process that changes the entire aspect ratio of the target image TI is employed, the face shape correction unit 200 shown in FIG. 1 may be employed as the face shape correction unit. However, it is possible to omit the deformation area dividing unit 250 and the divided area deformation unit 260 from the deformation processing unit. Instead, it is only necessary for the deformation processing unit to have the function of changing the aspect ratio of the target image TI. In addition, the face area adjustment unit 230 and the deformation area setting unit 240 may be omitted. The face area detection unit 220 may be used to detect the orientation of a subject. However, the face area detection unit 220 may be omitted. In addition, when the relative size Eyr is used, it is only necessary to additionally provide the size calculation unit 292 (FIG. 14).

Here, in place of the deformation process in which the target image TI is compressed along the width direction of a subject, the deformation process in which the target image TI is extended along the height direction of a subject may be employed. In this case as well, because a ratio of the width to the height of the subject is reduced, it is possible to approximate the impression of the subject obtained by observing the image to the impression obtained by observing the actual subject.

K. Alternative Example Embodiment

The elements of the above described example embodiments, other than the elements recited in the independent claims, are additive elements and may be appropriately omitted. The invention is not limited to the example embodiments described above, and may be modified into various alternative embodiments without departing from the scope of the invention as set forth in the appended claims. For example, the following alternative example embodiments are applicable.

First Alternative Example Embodiment

In the above example embodiments, the deformation area is set as a rectangular area; however the shape of the deformation area may be another shape (for example, an elliptical shape or a rhombic shape).

Second Alternative Example Embodiment

In the above example embodiments, the face shape correction printing process (FIG. 3) by the printer 100, which serves as an image processing device, is described; however, the face shape correction printing process may be performed in such a manner that, for example, the face shape correction and the display of a corrected image (step S100 and step S200) are executed by a personal computer and only the printing process (step S300) is executed by the printer. In addition, the printer 100 is not limited to an ink jet printer, but it may include printers of other types, such as a laser printer or a dye sublimation printer, for example.

In addition, the deformed image data may be not only used for printing but also used for a selected application. For example, a display device (for example, a projector) may be employed to use the image data for displaying.

Third Alternative Example Embodiment

In the above example embodiments, the subject is not limited to a person (face), and it may employ a selected subject. For example, a building or a vehicle may be employed. In any case as well, when the degree of deformation is adjusted so as to become strong (large) as a distance indicated by the distance parameter becomes shorter, it is possible to appropriately deform an image in conformity to the distance. In addition, the method of detecting a subject from the target image may employ a selected method. In addition, it is only necessary for the size calculation unit 292 (FIG. 14) to calculate the size on the target image by analyzing at least one of the entire subject and a portion of the subject, of which the actual size is substantially uniform independently of individual pieces.

Fourth Alternative Example Embodiment

In the above example embodiments, the deformation process may employ various processes. For example, the image in the deformation area may be not deformed in the height direction of the subject but may only be deformed in the horizontal direction of the subject.

In any case as well, it is desirable to employ the deformation process in which the size of at least a portion of the subject on the target image TI in one direction (hereinafter, referred to as "reducing direction") is reduced. In this manner, when the image and the actual subject are observed at an angle at which the reducing direction is oriented in a lateral direction as viewed from an observer, it is possible to approximate the impression of the subject obtained by observing the image to the impression obtained by observing the actual subject. Here, it is desirable to reduce the size shown by the contour of the subject in the reducing direction. That is, it is desirable that the length, in the reducing direction, of an area surrounded by the contour becomes small. In this manner, at least the contour of the subject is desirably deformed by the deformation process. In this manner, it is possible to appropriately approximate the impression of the subject obtained by observing the image to the impression obtained by observing the actual subject.

The reducing direction may be set in a selected direction on the target image TI. For example, a predetermined direction (for example, a direction parallel to the long side of the target image TI) may be employed as the reducing direction. However, it is desirable that an angle made by the reducing direction with the width direction of the subject is 30 degrees or below, it is particularly desirable that this angle is 15 degrees or below, and it is the most desirable that the reducing direction is oriented in the width direction of the subject. In this manner, in most cases, it is possible to execute natural and desirable deformation.

The method of determining the reducing direction so as to be approximated to the width direction of a subject may employ various methods. For example, the deformation processing unit may use information related to the width direction of a subject to thereby determine the reducing direction. The information related to the width direction of a subject may employ various pieces of information. For example, the detection result of the orientation of a subject may be employed. In the above described example embodiments, the face area detection unit 220 (FIG. 1, FIG. 14) detects the orientation of a subject (in this case, a face) by analyzing the target image TI. In addition, some photographic devices store vertical information, which indicates a vertical direction (gravitational direction) with respect to the ground when photographing, in an image file as history information. When such the vertical information is available, it is possible to specify the gravitational direction on the target image TI on the basis of the vertical information. Thus, it is possible to employ a direction perpendicular to that gravitational direction as the width direction of a subject.

In addition, the deformation processing unit may determine the reducing direction in accordance with instructions by a user. For example, the deformation processing unit may receive instructions that indicate the width direction of a subject and then determine the reducing direction in accordance with the received instructions.

In addition, there is a possibility that the width direction of a subject may be determined in advance to coincide with a predetermined direction on the target image TI. For example, in most target images TI that are photographed by a general user, the width direction of a subject is parallel to the long side of the target image TI. In such a case, the deformation processing unit may employ a predetermined direction (in this case, a direction parallel to the long side) on the target image TI as the width direction of a subject. That is, a predetermined direction on the target image TI may be employed as the reducing direction.

The above description may also apply to a case in which the subject is not the face of a person. In addition, a portion of the subject to be deformed may be selectively set.

Fifth Alternative Example Embodiment

In the above example embodiments, the size of a subject on the target image TI is not limited to the relative size Eyr shown in FIG. 15, and may employ various parameters. For example, the area of an image area that represents a subject may be employed as the size. When a face is used as a subject, the total number of pixels that exhibits a color in a predetermined skin color range may be used as the size of the subject. Pixels used for calculation of size are desirably selected from one face area FA. Here, in order to calculate the size that is not dependent on the pixel density of the target image TI, a value obtained by dividing the total number of pixels that display the subject by the number of all the pixels of the target image TI is desirably used as the size.

Sixth Alternative Example Embodiment

In the above example embodiments, a portion of a configuration implemented by hardware may be replaced by software, or, conversely, a portion of a configuration implemented by software may be replaced by hardware. For example, all the functions of the deformation area dividing unit 250 and the divided area deformation unit 260 shown in FIG. 1 may be implemented by a hardware circuit that includes a logic circuit.

On the other hand, when a portion or all of the functions of the aspects of the invention are implemented by software, the software (computer program) may be provided so that it is stored in a computer readable recording medium. In this description, a "computer readable recording medium" is not only a portable recording medium, such as a flexible disk or a CD-ROM, but also an internal storage device of the computer, such as various RAMs or ROMs, and an external storage device, such as a hard disk, fixed to the computer.

Seventh Alternative Example Embodiment

Manner to Perform Deformation Process

To perform the deformation process, the image processing device that performs deformation of an image may include a deformation area setting unit that sets at least portion of an area on a target image as a deformation area, a deformation area dividing unit that arranges a plurality of dividing points in the deformation area and divides the deformation area into a plurality of small areas by using a straight line that connects the dividing points one another, and a deformation processing unit that moves at least one of positions of the dividing points to deform the small areas to thereby perform deformation of an image in the deformation area.

In this image processing device, a plurality of dividing points are arranged in a deformation area that is set on the target image, and the deformation area is divided into a plurality of small areas using a straight line that connects the dividing points one another. In addition, the deformation process of an image in the deformation area is executed in such a manner that the positions of the dividing points are moved and thereby the small areas are deformed. In this manner, in this image processing device, it is possible to perform image deformation only by arranging dividing points in the deformation area and then moving the arranged dividing points. Thus, it is possible to easily and effectively achieve image processing of image deformation corresponding to various deformation modes.

The image processing device may further include a deformation mode setting unit that selects one of a plurality of predetermined deformation types and applies it to deformation of an image in the deformation area, wherein the deformation area dividing unit arranges the plurality of dividing points in accordance with a predetermined arrangement pattern that is associated with the set deformation type.

According to the above configuration, because the arrangement of dividing points, that is, dividing of the deformation area, appropriate to each of the deformation types, such as a deformation type to sharpen a face or a deformation type to enlarge eyes, for example, is performed, it is possible to further easily perform image processing for image deformation corresponding to each deformation type.

In addition, in the image processing device, the deformation mode setting unit may select one of a plurality of predetermined deformation degrees and sets it as a deformation degree applied to deformation of an image in the deformation area, and the deformation processing unit may move positions of the dividing points in accordance with a predetermined moving direction and amount of movement that are associated with a combination of the set deformation type and deformation degree.

According to the above configuration, when the deformation type and the deformation degree are set, image deformation in accordance with the combination of them is executed. Thus, it is possible to further easily perform image processing for image deformation.

In addition, in the image processing device, the deformation mode setting unit may include a specification acquiring unit acquires user specification related to the moving direction and amount of movement of at least one of the dividing points, and the deformation processing unit may move a position of the at least one of the dividing points in accordance with the acquired user specification.

According to the above configuration, it is possible to easily achieve image processing for image deformation in a mode that is further close to user's request.

In addition, in the image processing device, the deformation area setting unit may set the deformation area so as to include at least portion of an image of a face in the deformation area.

According to the above configuration, for the image of a face, it is possible to easily and effectively achieve image processing for image deformation corresponding to various deformation modes.

In addition, in the image processing device, the deformation area dividing unit may arrange the plurality of dividing points so that at least one pair of the dividing points are arranged at positions that are symmetrical with respect to a predetermined reference line, and the deformation processing unit may move the at least one pair of the dividing points while the positional relationship that the at least one pair of the dividing points are symmetrical with respect to the predetermined reference line is being maintained.

According to the above configuration, the image deformation that is bilaterally symmetrical with respect to a predetermined reference line is performed, so that it is possible to achieve image processing for image deformation of a further natural and desirable face image.

In addition, in the image processing device, the deformation processing unit may be configured not to perform deformation on at least one of the small areas.

According to the above configuration, a desired image deformation may be performed without largely changing the impression of a face, so that it is possible to achieve image processing for image deformation of a further natural and desirable face image.

In addition, in the image processing unit, the deformation processing unit may be configured not to perform deformation on the small area that includes the image of an eye.

According to the above configuration, by not performing deformation on the small area that includes the image of an eye, so that it is possible to achieve image processing for image deformation of a further natural and desirable face image.

In addition, the image processing device may further include a face area detection unit that detects a face area that displays the image of a face on the target image, and the deformation area setting unit may set the deformation area on the basis of the detected face area.

According to the above configuration, with respect to image deformation of the deformation area that is set on the basis of the face area detected from the target image, it is possible to easily and effectively achieve image deformation corresponding to various deformation modes.

In addition, the image processing device may further include a printing unit that prints out the target image on which deformation of an image in the deformation area has been performed.

According to the above configuration, it is possible to easily and effectively achieve printing of an image on which image deformation has been performed in correspondence with various deformation modes.

What is claimed is:

1. An image processing device comprising:
   a deformation processing unit that deforms at least a portion of an area on a target image, which is generated by photographing,
   wherein the deformation processing unit deforms the area, based on a distance between a photographic device and a subject of the target image;

a deformation amount adjustment unit that uses a distance parameter that correlates with the distance between photographic device and the subject of the target image when photographing to adjust a degree of deformation to increase as a distance indicated by the distance parameter becomes shorter;

a detection unit that detects a subject of a predetermined type on the target image; and a size calculation unit that calculates a size of the detected subject on the target image by analyzing the target image, wherein the deformation amount adjustment unit uses the size as the distance parameter that indicates that a distance is shorter as the size increases;

wherein, when a plurality of subjects are detected by the detection unit, the size calculation unit calculates the size for each of the subjects, and wherein the deformation amount adjustment unit adjusts the degree of deformation on the basis of a maximum size among the sizes of the subjects.

2. The image processing device according to claim 1, wherein the deformation processing unit executes the deformation so that at least a size in one direction of at least portion of the subject on the target image is reduced.

3. The image processing device according to claim 1, further comprising:

a deformation area setting unit that sets a portion of an area, which includes a subject detected by the detection unit, on the target image as a deformation area, wherein the deformation processing unit executes deformation of an image in the deformation area.

4. The image processing device according to claim 3, wherein the deformation area setting unit, when a plurality of subjects are detected by the detection unit, selects a maximum subject, of which the size is maximum, from among the plurality of subjects, and sets a portion of an area that includes the maximum subject as the deformation area.

5. The image processing device according to claim 3, wherein the deformation area setting unit, when a plurality of subjects are detected by the detection unit, selects a subject of which the size is larger than a given selection threshold value and sets the deformation area for each of the selected subjects.

6. The image processing device according to claim 3, wherein, when a plurality of subjects are detected by the detection unit, (A) the size calculation unit calculates the size for each of the subjects, (B) the deformation area setting unit sets the deformation area for each of the subjects, (C) the deformation amount adjustment unit adjusts the degree of deformation for each of the deformation areas, and (D) the deformation processing unit executes deformation of an image in each of the deformation areas in accordance with the degree of deformation that is adjusted for each of the deformation areas.

7. The image processing device according to claim 1, wherein the subject is a face of a person.

8. An image processing method performed by a processor comprising:

deforming at least a portion of an area on a target image, which is generated by photographing, wherein the area is deformed based on a distance between a photographic device and a subject of the target image;

adjusting a degree of deformation using a distance parameter that correlates with the distance between the photographic device and the subject of the target image when photographing, such that the degree of deformation increases as a distance indicated by the distance parameter becomes shorter;

detecting a subject of a predetermined type on the target image; and calculating a size of the detected subject on the target image by analyzing the target image, wherein the size is used as the distance parameter that indicates that a distance is shorter as the size increases;

wherein, when a plurality of subjects are detected, calculating the size for each of the subjects, and adjusting the degree of deformation on the basis of a maximum size among the sizes of the subjects, wherein the above steps are performed using one or more processors.

9. An image processing program embodied in a non-transitory computer-readable medium that causes a computer to execute processing with respect to image data, the processing comprising:

a deformation processing function that deforms at least a portion of an area on a target image, which is generated by photographing, based on a distance between a photographic device and a subject of the target image a deformation amount adjustment function that uses a distance parameter that correlates with the distance between photographic device and the subject of the target image when photographing to adjust a degree of deformation to increase as a distance indicated by the distance parameter becomes shorter;

a detection function that detects a subject of a predetermined type on the target image; and a size calculation function that calculates a size of the detected subject on the target image by analyzing the target image, wherein the deformation amount adjustment function uses the size as the distance parameter that indicates that a distance is shorter as the size increases;

wherein, when a plurality of subjects are detected, the size calculation function calculates the size for each of the subjects, and wherein the deformation amount adjustment function adjusts the degree of deformation on the basis of a maximum size among the sizes of the subjects.

* * * * *